(12) United States Patent
Euzen et al.

(10) Patent No.: US 7,790,019 B2
(45) Date of Patent: *Sep. 7, 2010

(54) ZEOLITIC CATALYST, SUBSTRATE BASED ON A SILICA-ALUMINA MATRIX AND ZEOLITE, AND HYDROCRACKING PROCESS FOR HYDROCARBON FEEDSTOCKS

(75) Inventors: Patrick Euzen, Paris (FR); Patrick Bourges, Lyons (FR); Hugues Dulot, Lyons (FR); Christophe Gueret, St Romain en Gal (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 776 days.

This patent is subject to a terminal disclaimer.

(21) Appl. No.: 10/584,144

(22) PCT Filed: Dec. 16, 2004

(86) PCT No.: PCT/FR2004/003270

§ 371 (c)(1),
(2), (4) Date: Apr. 27, 2007

(87) PCT Pub. No.: WO2005/070539

PCT Pub. Date: Aug. 4, 2005

(65) Prior Publication Data

US 2007/0209968 A1 Sep. 13, 2007

(30) Foreign Application Priority Data

Dec. 23, 2003 (FR) .................................. 03 15210

(51) Int. Cl.
*C10G 47/24* (2006.01)
*C10G 47/02* (2006.01)
*B01J 29/06* (2006.01)
(52) U.S. Cl. ........................... 208/108; 208/58; 208/59; 208/89; 208/111; 208/111.01; 208/111.3; 208/111.35; 502/63; 502/64; 502/66; 502/240; 502/254; 502/255; 502/256; 502/257; 502/258

(58) Field of Classification Search .................. 502/63, 502/64, 240, 254, 255, 66, 256, 257, 258; 208/58, 59, 89, 108, 111, 111.3, 111.35
See application file for complete search history.

(56) References Cited

U.S. PATENT DOCUMENTS

| 4,500,645 | A | 2/1985 | Fuchikami et al. |
| 4,738,941 | A | 4/1988 | Dufresne et al. |
| 5,453,411 | A | 9/1995 | Dai et al. |
| 5,500,109 | A | 3/1996 | Ware et al. |
| 6,045,687 | A | 4/2000 | George-Marchal et al. |
| 6,174,429 | B1 | 1/2001 | George-Marchal et al. |
| 7,160,436 | B2 * | 1/2007 | Benazzi et al. ................. 208/59 |
| 7,270,738 | B2 * | 9/2007 | Euzen et al. ............. 208/111.3 |
| 2002/0160906 | A1 | 10/2002 | Chen et al. |
| 2002/0160911 | A1 * | 10/2002 | Benazzi et al. .............. 502/240 |

FOREIGN PATENT DOCUMENTS

EP 0686687 A 12/1995

* cited by examiner

*Primary Examiner*—Glenn Caldarola
*Assistant Examiner*—Prem C. Singh
(74) *Attorney, Agent, or Firm*—Millen, White, Zelano & Branigan, P.C.

(57) ABSTRACT

The invention relates to a catalyst including at least one hydro-dehydrogenating element chosen from the group formed by the group VIB and group VIII elements of the periodic table and a substrate based on a silica-alumina matrix with a reduced content of macropores containing a quantity greater than 5% by weight and less than or equal to 95% by weight of silica ($SiO_2$) and based on at least one zeolite.

The invention also relates to a substrate based on a silica-alumina matrix with a reduced content of macropores containing a quantity greater than 5% by weight and less than or equal to 95% by weight of silica ($SiO_2$) and based on at least one zeolite.

The invention also relates to hydrocracking and/or hydroconversion processes and hydrotreating processes utilizing a catalyst according to the invention.

32 Claims, No Drawings

ZEOLITIC CATALYST, SUBSTRATE BASED ON A SILICA-ALUMINA MATRIX AND ZEOLITE, AND HYDROCRACKING PROCESS FOR HYDROCARBON FEEDSTOCKS

The invention relates to substrates based on a silica-alumina matrix and zeolite, catalysts, and hydroconversion processes making use thereof.

The aim of the process is essentially to produce middle distillates, that is to say cuts with an initial boiling point of at least 150° C. and an end boiling point to just below the initial boiling point of the residue, for example below 340° C., or below 370° C.

PRIOR ART

The hydrocracking of heavy petroleum fractions is a very important refining process that makes it possible to produce, from excess heavy feedstocks that cannot be readily upgraded, lighter fractions such as gasolines, jet fuels and light gas oils that the refiner seeks to adapt his production to the structure of the demand. Some hydrocracking processes make it possible also to obtain a greatly purified residue that can constitute an excellent base for oils. Relative to catalytic cracking, the advantage of catalytic hydrocracking is to provide middle distillates, jet fuels and gas oils of very good quality. Conversely, the gasoline that is produced has an octane number that is much lower than the one that is obtained from catalytic cracking.

Hydrocracking is a process which owes its flexibility to three principal factors, namely the operating conditions employed, the types of catalysts used, and the fact that hydrocracking of hydrocarbon feedstocks can be accomplished in one or two steps.

The catalysts that are used in hydrocracking are all of the bifunctional type combining an acid function with a hydrogenating function. The acid function is provided by substrates that generally have surface areas ranging from 150 to 800 $m^2.g^{-1}$ and having a superficial acidity, such as halogenated aluminas (chlorinated or fluorinated in particular), combinations of oxides of boron and aluminium, amorphous silica-aluminas and zeolites. The hydrogenating function is provided either by one or more metals of group VIII of the periodic table, or by a combination of at least one metal of group VIB of the periodic table, and at least one metal of group VIII.

The balance between the two acid and hydrogenating functions is one of the parameters that govern the activity and the selectivity of the catalyst. A weak acid function and a strong hydrogenating function provide catalysts that are not very active but that work at a temperature that is generally high (greater than or equal to 390-400° C.) and at a low feed volumetric flow rate (the VVH expressed by volume of feedstock to be treated per unit of volume of catalyst and per hour is generally less than or equal to 2) but endowed with a very good selectivity on middle distillates. Conversely, a strong acid function and a weak hydrogenating function provide active catalysts but which exhibit less favourable selectivities on middle distillates (jet fuels and gas oils).

One type of conventional hydrocracking catalysts is based on moderately acidic amorphous substrates, such as silica-aluminas for example. These systems are used to produce middle distillates of good quality and, optionally, base oils. These catalysts are used for example in two-stage processes.

The performance of these catalysts is closely tied to their physicochemical characteristics, and more particularly to their textural characteristics. Thus, and in a general manner, the presence of macropores in catalysts including a silica-alumina (such as those described for example in U.S. Pat. No. 5,370,788) is a disadvantage. Macropores are understood to be pores having a diameter larger than 500 Å.

In seeking to resolve this problem, the applicant was first led to prepare matrices of hydrocracking catalysts with a reduced content of macropores.

The performance of catalysts is also correlated to their structure: amorphous or crystalline. Catalysts partly including a zeolite or a mixture of zeolites have a higher catalytic activity than that of amorphous silica-aluminas, but have higher selectivities on light products.

The applicant found, in an unexpected manner, that the incorporation into a matrix, with a reduced content of macropores, of certain zeolites alone or in a mixture led to the preparation of catalysts giving improved catalytic performance in hydrocracking processes compared with prior art catalysts.

More precisely, the invention relates to a hydrocracking/hydroconversion catalyst, the substrate used to prepare said catalyst, and the hydrocracking process making use thereof.

DETAILED DESCRIPTION OF THE INVENTION

Characterisation Techniques

In the following presentation of the invention, specific surface area is defined as the B.E.T. specific surface area that is determined by nitrogen adsorption according to ASTM Standard D 3663-78 established from the BRUNAUER-EMMETT-TELLER method described in the periodical "The Journal of America Society," 60, 309, (1938).

In the following presentation of the invention, mercury volume of the substrates and catalysts is defined as the volume that is measured by mercury porosimeter intrusion according to the ASTM Standard D4284-83 at a maximum pressure of 4000 bar, using a surface tension of 484 dyne/cm and a contact angle for the amorphous silica-alumina substrates of 140°. The mean mercury diameter is defined as being a diameter such that all of the pores of a size less than this diameter constitute 50% of the pore volume ($V_{Hg}$) in an interval comprised between 36 Å and 1000 Å. One of the reasons for which it is preferable to use the substrate as a base to define the pore distribution resides in the fact that the contact angle of the mercury varies after impregnation of metals based on the nature and the type of metals. The wetting angle was assumed to be equal to 140° by following the recommendations of the work "Techniques de l'ingénieur, traité analyse et caractérisation [Engineering Techniques, Analytical Treatise and Characterisation]," P 1050-5, written by Jean Charpin and Bernard Rasneur.

To obtain a better precision, the value of the mercury volume in ml/g that is provided in the text below corresponds to the value of the total mercury volume in ml/g measured in the sample minus the value of the mercury volume in ml/g that is measured in the same sample for a pressure corresponding to 30 psi (about 2 bar). The mean mercury diameter is also defined as being a diameter such that all of the pores of a size less than this diameter constitute 50% of the total mercury pore volume.

Finally, to better characterise the pore distribution, the following pore distribution criteria in terms of mercury are defined: volume V1 corresponds to the volume that is contained in the pores whose diameter is less than the mean diameter minus 30 Å. Volume V2 corresponds to the volume that is contained in the pores with diameters that are greater than or equal to the mean diameter minus 30 Å and less than the mean diameter plus 30 Å. Volume V3 corresponds to the volume that is contained in the pores with diameters that are more than or equal to the mean diameter plus 30 Å. Volume V4 corresponds to the volume that is contained in the pores whose diameters are less than the mean diameter minus 15 Å. Volume V5 corresponds to the volume that is contained in the pores with diameters that are greater than or equal to the mean diameter minus 15 Å and less than the mean diameter plus 15 Å. Volume V6 corresponds to the volume that is contained in the pores with diameters that are greater than or equal to the mean diameter plus 15 Å.

The pore distribution measured by nitrogen adsorption was determined by the Barrett-Joyner-Halenda (BJH) model. The nitrogen adsorption-desorption isotherm according to the BJH model is described in the periodical "The Journal of American Society," 73, 373, (1951) written by E. P. Barrett, L. G. Joyner and P. P. Halenda. In the following presentation of the invention, nitrogen adsorption volume is understood to mean the measured volume for $P/P_0=0.99$, pressure for which it is assumed that nitrogen filled all the pores. The nitrogen desorption mean diameter is defined as being a diameter such that all of the pores smaller than this diameter constitute 50% of the pore volume (Vp) measured on the desorption branch of the nitrogen isotherm.

Adsorption surface area is understood to mean the surface area measured on the branch of the adsorption isotherm. Reference will be made to, for example, the article by A. Lecloux "Mémoires Société Royale des Sciences de Liège, $6^{th}$ series, Tome I [Volume 1], fasc. 4 [Section 4], pp. 169-209 (1971)".

The sodium content was measured by atomic absorption spectrometry.

X-ray diffraction is a technique that can be used to characterise the substrates and catalysts according to the invention. In the following presentation, the X-ray analysis is carried out on powder with a Philips PW 1830 diffractometer that operates in reflection and is equipped with a rear monochromator by using CoKalpha radiation ($\lambda K_{\alpha 1}=1.7890$ Å, $\lambda I K_{\alpha 2}=1.793$ Å, intensity ratio $K_{\alpha 1}/K_{\alpha 2}=0.5$). For the X-ray diffraction diagram of gamma-alumina, reference will be made to the ICDD data base, form 10-0425. In particular, the two most intense peaks are located at a position that corresponds to a "d" value comprised between 1.39 and 1.40 Å and a "d" value comprised between 1.97 Å to 2.00 Å. The "d" value refers to the interreticular distance derived from the angular position by using Bragg's equation $(2d_{(hkl)}*\sin(\theta)=N*\lambda)$. Gamma-alumina is defined in the text below, inter alia, as, for example, an alumina contained in the group that consists of cubic gamma-aluminas, pseudo-cubic gamma-aluminas, tetragonal gamma-aluminas, poorly or slightly crystallised gamma-aluminas, large-surface gamma-aluminas, low-surface gamma-aluminas, gamma-aluminas that are obtained from coarse boehmite, gamma-aluminas that are obtained from crystallised boehmite, gamma-aluminas that are obtained from boehmite that is slightly or poorly crystallised, gamma-aluminas that are obtained from a mixture of crystallised boehmite and an amorphous gel, gamma-aluminas that are obtained from an amorphous gel, and gamma-aluminas evolving toward delta. For the positions of the diffraction peaks of eta, delta and theta aluminas, reference may be made to the article by B. C. Lippens and J. J. Steggerda in Physical and Chemical Aspects of Adsorbents and Catalysts, E. G. Linsen (Ed.), Academic Press, London. 1970, pp. 171-211.

For the substrates and catalysts according to the invention, the X-ray diffraction diagram demonstrates a wide peak that is characteristic of the presence of amorphous silica. Furthermore, in the entire text that follows, the alumina compound can contain an amorphous fraction that is difficult to detect by DRX techniques. It will therefore be understood below that the alumina compounds that are used or described in the text can contain an amorphous or poorly crystallised fraction.

The substrates and catalysts according to the invention have been analysed by NMR MAS of the solid of $^{27}$Al on a spectrometer of the Brücker Company such as MSL 400, with a 4 mm probe. The speed of rotation of the samples is in the order of 11 kHz. Potentially, the NMR analysis of the aluminium makes it possible to distinguish three types of aluminium whose chemical displacements are presented below:

Between 100 and 40 ppm, tetra-coordinated type aluminium, denoted as $Al_{IV}$,

Between 40 and 20 ppm, penta-coordinated type aluminium, denoted as $Al_V$,

Between 20 and −100 ppm, hexa-coordinated type aluminium, denoted as $Al_{VI}$.

The aluminium atom is a quadrupolar nucleus. Under certain analysis conditions (weak radiofrequency fields: 30 kHz, low impulse angle: $\pi/2$ and water-saturated sample), the NMR technique of magic angle spinning (MAS) is a quantitative technique. The decomposition of the NMR MAS spectra makes it possible to gain access directly to the amount of different species. The spectrum is locked in chemical displacement relative to a 1 M solution of aluminium nitrate. The aluminium signal is at zero ppm. We chose to integrate the signals between 100 and 20 ppm for $Al_{IV}$ and $Al_V$, which corresponds to area 1, and between 20 and −100 ppm for $Al_{VI}$, which corresponds to area 2. In the following presentation of the invention, the expression proportion of octahedral $Al_{VI}$ is defined as the following ratio: area 2/(area 1+area 2).

A method of characterisation of the substrates and catalysts according to the invention that can be used is transmission electron microscopy (TEM). For this purpose, an electron microscope (such as Jeol 2010 or Philips Tecna120F, optionally with scanning) equipped with an energy dispersion spectrometer (EDS) for X-ray analysis (for example a Tracor or an Edax) is used. The EDS detector should make possible the detection of light elements. The combination of these two tools, TEM and EDS, makes it possible to combine the imagery and the local chemical analysis with a good spatial resolution.

For this type of analysis, the samples are finely ground in the dry state in a mortar: the powder is then included in the resin to produce ultrafine fractions with a thickness of about 70 nm. These fractions are collected on Cu grids that are covered by an amorphous carbon film with holes used as a support. They are then introduced into the microscope for observation and analysis under secondary vacuum. By imagery, the sample zones are then easily distinguished from the resin zones. A certain number of analyses, 10 at a minimum, preferably between 15 and 30, are then performed on different zones of the industrial sample. The size of the electron beam for the analysis of the zones (approximately determining the size of the analysed zones) is 50 nm in diameter at a maximum, preferably 20 nm, even more preferably 10, 5, 2 or 1 nm in diameter. In the scanned mode, the analysed zone will be based on the size of the scanned zone and no longer on the size of the beam, which is generally reduced.

Semi-quantitative processing of the X-ray spectra acquired with the aid of the EDS spectrometer makes it possible to obtain the relative concentration of Al and Si (in atomic %) and the Si/Al ratio for each of the analysed zones. It is then possible to calculate the $Si/Al_m$ mean and the standard deviation $\sigma$ of this set of measurements.

In the non-limiting examples of the following presentation of the invention, the 50 nm probe is the probe used to characterise the substrates and catalysts according to the invention, unless otherwise indicated.

The zeolites used for the preparation of the hydrocracking catalysts are characterised by several parameters such as their structural molar ratio $SiO_2/Al_2O_3$, their lattice parameter, their pore distribution, their specific surface area, their sodium ion take-up capacity, or their water vapour adsorption capacity.

The peak ratio and crystalline fraction are important parameters to be considered. The peak ratios and crystalline fractions are determined by X-ray diffraction relative to a reference zeolite, using a procedure derived from the method ASTM D3906-97 "Determination of Relative X-ray Diffraction Intensities of Faujasite-Type-Containing Materials". Reference may be made to this method for the general conditions of application of the procedure and, in particular, for the preparation of samples and references.

A diffractogram is composed of lines characteristic of the crystallised fraction of the sample and a background, produced essentially by diffusion of the amorphous or microcrystalline fraction of the sample (a weak diffusion signal is associated with the apparatus, air, sample holder, etc.). The peak ratio of a zeolite is the ratio, in a predefined zone angular (typically 8 to 40° 2θ when the Kα radiation of copper is used, $l=0.154$ nm), of the area of the lines of the zeolite (peaks) to the total area of the diffractogram (peaks+background). This peaks/(peaks+background) ratio is proportional to the amount of crystallised zeolite in the material. To estimate the crystalline fraction of a Y zeolite sample, the peak ratio of the sample will be compared to that of a reference considered to be 100% crystallised (NaY for example). The peak ratio of a perfectly crystallised NaY zeolite is in the order of 0.55 to 0.60. The packing density (DRT) is measured in the manner described in the work "Applied Heterogeneous Catalysis" by J. F. Le Page, J. Cosyns, P. Courty, E. Freund, J. P. Franck, Y. Jacquin, B. Juguin, C. Marcilly, G. Martino, J. Miguel, R. Montarnal, A. Sugier, H. Van Landeghem, Technip, Paris, 1987. A graduated cylinder of acceptable dimensions is filled with catalyst or substrate by successive additions; and between each addition, the catalyst is packed by shaking the cylinder until a constant volume is achieved. This measurement is generally carried out on 1000 cm³ of catalyst or substrate packed into a cylinder whose height-to-diameter ratio is close to 5:1. This measurement can preferably be made on automated devices such as Autotap® marketed by Quantachrome®.

The acidity of the matrix is measured by infra-red (IR) spectrometry. The IR spectra are recorded on a Nicolet interferometer such as Nexus-670 at a resolution of 4 cm$^{-1}$ with a Happ-Genzel-type apodization. The sample (20 mg) is pressed in the form of a self-supported pellet, then is placed in an in-situ analysis cell (25° C. to 550° C., furnace offset from the IR beam, secondary vacuum of $10^{-6}$ mbar). The diameter of the pellet is 16 mm.

The sample is pretreated in the following way to eliminate the physisorbed water and to dehydroxylate partially the surface of the catalyst to obtain a representative image of the acidity of the catalyst in use:

increase in temperature from 25° C. to 300° C. in 3 hours, plateau of 10 hours at 300° C.,
drop in temperature from 300° C. to 25° C. in 3 hours.

The basic probe (pyridine) is then adsorbed at saturating pressure at 25° C. and then thermo-desorbed according to the following plateaus:

25° C. for 2 hours under secondary vacuum,
100° C. for 1 hour under secondary vacuum,
200° C. for 1 hour under secondary vacuum,
300° C. for 1 hour under secondary vacuum.

A spectrum is recorded at 25° C. at the end of the pretreatment and at each desorption plateau in transmission mode with an accumulation time of 100 s. The spectra are set to iso-mass (i.e. assumed to be at iso-thickness) (20 mg exactly). The number of Lewis sites is proportional to the surface area of the peak whose maximum lies around 1450 cm$^{-1}$, including any shoulder. The number of Bronsted sites is proportional to the surface area of the peak whose maximum is located toward 1545 cm$^{-1}$. The ratio of the number of Bronsted sites/number of Lewis sites (B/L) is estimated to be equal to the ratio of the surfaces of two peaks described above. The surface of the peaks at 25° C. is generally used. This B/L ratio is generally calculated from the spectrum that is recorded at 25° C. at the end of the pretreatment.

OBJECTS OF THE INVENTION

More precisely, the invention relates to a catalyst including at least one hydro-dehydrogenating element chosen from the group formed by the group VIB and group VIII elements of the periodic table and a substrate based on at least one zeolite and based on a silica-alumina matrix, said matrix containing a quantity greater than 5% by weight and less than or equal to 95% by weight of silica ($SiO_2$), said catalyst having the following characteristics:

a mean pore diameter, measured by mercury porosimetry, comprised between 20 and 140 Å,
a total pore volume, measured by mercury porosimetry, comprised between 0.1 ml/g and 0.6 ml/g,
a total pore volume, measured by nitrogen porosimetry, comprised between 0.1 ml/g and 0.6 ml/g,
a BET specific surface area comprised between 100 and 600 m²/g, preferably less than 500 m²/g,
a pore volume, measured by mercury porosimetry, contained in the pores with diameters of more than 140 Å, of less than 0.1 ml/g,
a pore volume, measured by mercury porosimetry, contained in the pores with diameters of more than 160 Å, of less than 0.1 ml/g,
a pore volume, measured by mercury porosimetry, contained in the pores with diameters of more than 200 Å, of less than 0.1 ml/g,
a pore volume, measured by mercury porosimetry, contained in the pores with diameters of more than 500 Å, of less than 0.01 ml/g,
a packing density of the catalysts more than 0.85 g/cm³, preferably more than 0.95 g/cm³, very preferably more than 1.025 cm³/g and even more preferably more than 1.1 g/cm³,
an X-ray diffraction diagram which contains at least the main lines characteristic of at least one of the transition aluminas that are included in the group composed of alpha, rho, chi, eta, gamma, kappa, theta and delta aluminas.

Depending on the content of zeolite introduced, the X-ray diffraction diagram of the catalyst also generally contains the main lines characteristic of the selected zeolite or zeolites.

More precisely, the invention relates to a substrate including:

at least one zeolite,
a non-zeolitic matrix based on silica-alumina containing a quantity greater than 5% by weight and less than or equal to 95% by weight of silica ($SiO_2$), said substrate being characterised by:
- a mean pore diameter, measured by mercury porosimetry, comprised between 20 and 140 Å,
- a total pore volume, measured by mercury porosimetry, comprised between 0.1 ml/g and 0.6 ml/g,
- a total pore volume, measured by nitrogen porosimetry, comprised between 0.1 ml/g and 0.6 ml/g,
- a BET specific surface area comprised between 100 and 650 m$^2$/g,
- a pore volume, measured by mercury porosimetry, contained in the pores with diameters of more than 140 Å, of less than 0.1 ml/g,
- a pore volume, measured by mercury porosimetry, contained in the pores with diameters of more than 160 Å, of less than 0.1 ml/g,
- a pore volume, measured by mercury porosimetry, contained in the pores with diameters of more than 200 Å, of less than 0.1 ml/g,
- a pore volume, measured by mercury porosimetry, contained in the pores with diameters of more than 500 Å, of less than 0.01 ml/g,
- an X-ray diffraction diagram which contains at least the main lines characteristic of at least one of the transition aluminas that are included in the group composed of rho, chi, eta, gamma, kappa, theta and delta aluminas.

The packing density of the substrates, after calcination, is more than 0.65 g/cm$^3$, preferably more than 0.72 g/cm$^3$, very preferably more than 0.75 g/cm$^3$, and even more preferably more than 0.78 g/cm$^3$.

A catalyst containing the foregoing substrate is also included in the invention.

The invention also relates to a hydrocracking and/or hydroconversion process, and a hydrotreating process for hydrocarbon feedstocks using said substrates or catalysts.

DETAILED DESCRIPTION OF THE INVENTION

Characteristics of the Catalyst

The catalyst according to the present invention includes a substrate including:
- at least one zeolite,
- a non-zeolitic silica-alumina-based matrix (i.e. including silica and alumina) with a content by weight of silica (SiO$_2$) more than 5% by weight and less than or equal to 95% by weight, preferably comprised between 10 and 80% by weight, preferably a silica content more than 20% by weight and less than 80% by weight, and even more preferably more than 25% by weight and less than 75% by weight, and the silica content is advantageously comprised between 10 and 50% by weight, said matrix having the following characteristics:
- preferably a cationic impurities content less than 0.1% by weight, preferably less than 0.05% by weight, and even more preferably less than 0.025% by weight. Cationic impurities content is understood to mean the total alkalines content,
- preferably an anionic impurities content less than 1% by weight, preferably less than 0.5% by weight, and even more preferably less than 0.1% by weight.

The silica-alumina used in the process according to the invention is preferably a silica-alumina that is homogeneous on the micrometer scale and in which the cationic impurities content (for example Na$^+$) is less than 0.1% by weight, preferably less than 0.05% by weight and even more preferably less than 0.025% by weight, and the anionic impurities content (for example SO$_4^{2-}$, Cl$^-$) is less than 1% by weight, preferably less than 0.5% by weight and even more preferably less than 0.1% by weight.

Thus, any silica-alumina synthesis process that is known to the person skilled in the art that leads to a silica-alumina that is homogeneous on the micrometer scale and in which the cationic impurities (for example, Na$^+$) can be set at less than 0.1%, preferably to a content that is less than 0.05% by weight, and even more preferably to a content that is less than 0.025% by weight and in which the anionic impurities (for example SO$_4^{2-}$, Cl$^-$) can be set at less than 1% and more preferably to a content that is less than 0.05% by weight, is suitable for preparing the substrates that are the object of the invention, said catalyst having the following characteristics:
- a mean pore diameter, measured by mercury porosimetry, comprised between 20 and 140 Å, preferably between 40 and 120 Å and even more preferably between 50 and 100 Å,
- preferably a ratio between the volume V2, measured by mercury porosimetry, comprised between $D_{mean}$−30 Å and $D_{mean}$+30 Å, to the total pore volume also measured by mercury porosimetry, that is more than 0.6, preferably more than 0.7 and even more preferably more than 0.8,
- preferably a volume V3 contained in the pores of diameters greater than $D_{mean}$+30 Å, measured by mercury porosimetry, that is less than 0.1 ml/g, preferably less than 0.06 ml/g and even more preferably less than 0.04 ml/g,
- preferably a ratio between the volume V5 comprised between $D_{mean}$−15 Å and $D_{mean}$+15 Å measured by mercury porosimetry, and the volume V2 comprised between $D_{mean}$−30 Å and $D_{mean}$+30 Å, measured by mercury porosimetry, that is more than 0.6, preferably more than 0.7 and even more preferably more than 0.8,
- preferably a volume V6 contained in the pores of diameters greater than $D_{mean}$+15 Å, measured by mercury porosimetry, that is less than 0.2 ml/g, preferably less than 0.1 ml/g and even more preferably less than 0.05 ml/g,
- a total pore volume, measured by mercury porosimetry, comprised between 0.1 ml/g and 0.6 ml/g, preferably comprised between 0.20 and 0.50 ml/g and even more preferably more than 0.20 ml/g,
- a total pore volume, measured by nitrogen porosimetry, comprised between 0.1 ml/g and 0.6 ml/g, preferably comprised between 0.20 and 0.50 ml/g,
- a BET specific surface area comprised between 100 and 600 m$^2$/g, preferably comprised between 150 and 500 m$^2$/g,
- preferably an adsorption surface such that the ratio between the adsorption surface and the BET surface area is more than 0.5, preferably more than 0.65 and more preferably more than 0.8,
- a pore volume, measured by mercury porosimetry, contained in the pores of diameter greater than 140 Å, that is less than 0.1 ml/g, preferably less than 0.05 ml/g and even more preferably less than 0.03 ml/g,
- a pore volume, measured by mercury porosimetry, contained in the pores of diameter greater than 160 Å, that is less than 0.1 ml/g, preferably less than 0.05 ml/g and even more preferably less than 0.025 ml/g,
- a pore volume, measured by mercury porosimetry, contained in the pores of diameter greater than 200 Å, that is less than 0.1 ml/g, preferably less than 0.05 ml/g and even more preferably less than 0.025 ml/g, a pore volume, measured by mercury porosimetry, contained in the pores of diameter greater than 500 Å, that is less than 0.01 ml/g, an X-ray diffraction diagram which contains at least the main lines characteristic of at least one of the transition aluminas included in the group composed of rho, chi, kappa, eta, gamma, theta and delta aluminas, and preferably characterised in that it contains at least the main lines characteristics of at least one of the transition aluminas contained in the group composed of gamma, eta, theta and delta alumina, and more preferably characterised in that it contains at least the main lines characteristic of gamma and eta alumina, and even more preferably characterised in that it contains peaks with a "d" value comprised between 1.39 and 1.40 Å and with a "d" value comprised between 1.97 Å and 2.00 Å;

the catalyst additionally including:

at least one hydro-dehydrogenating element selected from the group formed by the group VIB and group VIII elements of the periodic table, preferably a content by weight of group VIB metal(s), in metallic form or in oxide form, comprised between 1 and 50% by weight, preferably between 1.5 and 35%, and even more preferably between 1.5 and 30%, preferably a content by weight of group VIII metals, in metallic form or in oxide form, comprised between 0.1 and 30% by weight, preferably between 0.2 and 25%, and even more preferably between 0.2 and 20%, optionally at least one doping element that is deposited on the catalyst and selected from the group formed by phosphorus, boron and silicon. The contents by weight of boron, silicon, and phosphorus in the form of oxides are between 0.1 and 15%, preferably between 0.1 and 10%, and still more advantageously between 0.1 and 5% by weight. The expression doping element is understood to mean an element that is introduced after the preparation of the silica-alumina substrate described above, optionally at least one group VIIB element (for example and preferably manganese) and a content by weight comprised between 0 and 20%, preferably between 0 and 10%, of the compound in oxide or metal form, optionally at least one group VB element (for example and preferably niobium), and a content by weight comprised between 0 and 40%, preferably between 0 and 20%, of the compound in oxide or metal form.

The packing density of the catalysts is more than 0.85 g/cm$^3$, preferably more than 0.95 g/cm$^3$, very preferably more than 1.025 g/cm$^3$, and even more preferably more than 1.1 g/cm$^3$.

The NMR MAS spectra of the $^{27}$Al solid of the silica-alumina matrix show two distinct clusters of peaks. A first type of aluminium whose maximum resonates around 10 ppm extends between −100 and 20 ppm. The position of the maximum suggests that these species are essentially of the type $Al_{VI}$ (octahedral). A second type of minority aluminium whose maximum resonates around 60 ppm extends between 20 and 110 ppm. This cluster can be broken down into at least two species. The predominant species in this cluster corresponds to atoms of $Al_{IV}$ (tetrahedral). For the matrices such as those defined in the present invention, advantageously, the proportion of octahedral $Al_{VI}$ is more than 50%, preferably more than 60%, and even more preferably more than 70%.

In an embodiment of the invention, the catalyst contains a matrix including at least two silica-alumina zones, said zones having Si/Al ratios that are less than or greater than the overall Si/Al ratio determined by X-ray fluorescence. Thus a matrix having an Si/Al ratio equal to 0.5 includes for example two silica-alumina zones, one of the zones has an Si/Al ratio determined by TEM that is less than 0.5 and the other zone has a Si/Al ratio determined by TEM that is comprised between 0.5 and 2.5.

In another embodiment of the invention, the catalyst contains a matrix including one silica-alumina zone, said zone having an Si/Al ratio equal to the overall Si/Al ratio determined by X-ray fluorescence and less than 2.3.

The total content by weight of zeolite in the catalyst is generally comprised between 0.1% and 30%, advantageously between 0.2% and 25%, preferably between 0.3% and 20%, very preferably between 0.5% and 20%, and even more preferably between 1% and 10%.

Depending on the content of zeolite introduced, the X-ray diffraction diagram of the catalyst also generally contains the main lines characteristic of the selected zeolite or zeolites.

In a preferred embodiment of the invention, the zeolite is selected from the FAU group and/or from the group formed by Y zeolite and Y zeolites that have undergone secondary treatment such as in particular: USY, VUSY, SDUSY, HMUSY, DAY.

The Y zeolite used in the catalysts according to the invention is at least partially in the form of hydrogen or acid (H+) or ammonium (NH4+) or cationic, said cation being selected from the group formed by the groups IA, IB, IIA, IIB, IIIA, IIIB (including the rare earths), Sn, Pb and Si, and it is preferably at least partially in the form H+ or it can also be used at least partially in cationic form (such as defined above).

In another preferred embodiment of the invention, the zeolite is a zeolite selected from the group formed by the zeolites ZBM-30, ZSM-48, EU-2 and EU-11, preferably zeolite ZBM-30, used alone or in a mixture with other zeolites.

In another embodiment of the invention, the zeolite is a zeolite selected from the group formed by the zeolites Mordenite, Beta, NU-87, EU-1, preferably zeolite MOR, used alone or in a mixture with other zeolites.

The catalyst according to the invention has better activity without loss of selectivity on middle distillates. Without wishing to be tied to any one theory, it appears that this particularly high level of activity without notable loss of selectivity of the catalysts of the present invention is related to the synergy effect between the zeolite and the silica-alumina matrix.

Characteristics of the Substrate

The catalyst thus obtained is prepared, by any technique known to the person skilled in the art, from a substrate which contains at least one zeolite and which contains a silica-alumina matrix in which the content by weight of silica ($SiO_2$) is more than 5% by weight and less than or equal to 95% by weight of silica ($SiO_2$), said substrate having the following characteristics:

the mean pore diameter, measured by mercury porosimetry, is comprised between 20 and 140 Å, preferably between 40 and 120 Å, and even more preferably between 50 and 100 Å, preferably the ratio between the volume V2, measured by mercury porosimetry, comprised between $D_{mean}$−30 Å and $D_{mean}$+30 Å, to the total pore volume also measured by mercury porosimetry, is more than 0.6, more preferably more than 0.7, and even more preferably more than 0.8, preferably the volume V3 contained in the pores of diameters greater than $D_{mean}$+30 Å, measured by mercury porosimetry, is less than 0.1 ml/g, preferably less than 0.06 ml/g, and even more preferably less than 0.04 ml/g, preferably the ratio between the volume V5, measured by mercury porosimetry, comprised between $D_{mean}$−15 Å and $D_{mean}$+15 Å, to the volume V2, measured by mercury porosimetry, comprised between $D_{mean}$−30 Å and $D_{mean}$+30 Å, is more than 0.6, more preferably more than 0.7, and even more preferably more than 0.8, preferably the volume V6 contained in the pores of diameters greater than $D_{mean}$+15 Å, measured by mercury porosimetry, is less than 0.2 ml/g, preferably less than 0.1 ml/g, and even more preferably less than 0.05 ml/g, the total pore volume, measured by mercury porosimetry, is comprised between 0.1 ml/g and 0.6 ml/g, preferably comprised between 0.20 and 0.50 ml/g, and even more preferably more than 0.20 ml/g, the total pore volume, measured by nitrogen adsorption, is comprised between 0.1 ml/g and 0.6 ml/g, preferably comprised between 0.20 and 0.50 ml/g, the BET specific surface area is comprised between 100 and 650 m$^2$/g, preferably comprised between 150 and 600 m$^2$/g, preferably the adsorption surface is such that the ratio between the adsorption surface and the BET surface area is more than 0.5, preferably more than 0.65, and more preferably more than 0.8, the pore volume, measured by mercury porosimetry, contained in the pores of diameter greater than 140 Å, is less than 0.1 ml/g, preferably less than 0.05 ml/g, and even more preferably less than 0.03 ml/g, the pore volume, measured by mercury porosimetry, contained in the pores of diameter greater than 160 Å, is less than 0.1 ml/g, preferably less than 0.05 ml/g, and even more preferably less than 0.025 ml/g, the pore volume, measured by mercury porosimetry, contained in the pores of diameter greater than 200 Å, is less than 0.1 ml/g, preferably less than 0.05 ml/g, and even more preferably less than 0.025 ml/g, the pore volume, measured by mercury porosimetry, contained in the pores with diameters greater than 500 Å, is less than 0.01 ml/g, the X-ray diffraction diagram contains at least the main lines characteristic of at least one of the transition aluminas included in the group composed of alpha, rho, chi, kappa, eta, gamma, theta and delta aluminas, and preferably characterised in that it contains at least the main lines characteristics of at least one of the transition aluminas contained in the group composed of gamma, eta, theta and delta alumina, and more preferably characterised in that it contains at least the main lines characteristic of gamma and eta alumina, and even more preferably characterised in that it contains peaks with a "d" value comprised between 1.39 and 1.40 Å and with a "d" value comprised between 1.97 Å and 2.00 Å.

Depending on the content of zeolite introduced, the X-ray diffraction diagram of the substrate also generally contains the main lines characteristic of the selected zeolite or zeolites.

In a preferred embodiment of the invention, the zeolite is selected from the FAU group and/or from the group formed by Y zeolite and Y zeolites that have undergone secondary treatment such as in particular: USY, VUSY, SDUSY, HMUSY, DAY.

The Y zeolite used in the catalysts according to the invention is at least partially in the form of hydrogen or acid (H+) or ammonium (NH4+) or cationic, said cation being selected from the group formed by the groups IA, IB, IIA, IIB, IIIA, IIIB (including the rare earths), Sn, Pb and Si, and it is preferably at least partially in the form H+ or it can also be used at least partially in cationic form (such as defined above).

In another preferred embodiment of the invention, the zeolite is a zeolite selected from the group formed by the zeolites ZBM-30, ZSM-48, EU-2 and EU-11, preferably zeolite ZBM-30, used alone or in a mixture with other zeolites.

In another embodiment of the invention, the zeolite is a zeolite selected from the group formed by the zeolites Mordenite, Beta, NU-87, EU-1, preferably zeolite MOR, used alone or in a mixture with other zeolites.

The silica-alumina matrix used in the substrate according to the invention has the following characteristics:

the content by weight of silica ($SiO_2$) is more than 5% by weight and less than or equal to 95% by weight of silica ($SiO_2$), preferably comprised between 10 and 80% by weight, preferably a silica content more than 20% by weight and less than 80% by weight, and even more preferably more than 25% by weight and less than 75% by weight, the silica content is advantageously comprised between 10 and 50% by weight, preferably the cationic impurities content is less than 0.1% by weight, preferably less than 0.05% by weight, and even more preferably less than 0.025% by weight. Cationic impurities content is understood to mean the total alkalines content.

preferably the anionic impurities content is less than 1% by weight, preferably less than 0.5% by weight, and even more preferably less than 0.1% by weight, the mean pore diameter, measured by mercury porosimetry, is comprised between 20 and 140 Å, preferably between 40 and 120 Å, and even more preferably between 50 and 100 Å, preferably the ratio between the volume V2, measured by mercury porosimetry, comprised between $D_{mean}$−30 Å and $D_{mean}$+30 Å, to the total pore volume also measured by mercury porosimetry, is more than 0.6, more preferably more than 0.7, and even more preferably more than 0.8, preferably the volume V3 contained in the pores of diameters greater than $D_{mean}$+30 Å, measured by mercury porosimetry, is less than 0.1 ml/g, preferably less than 0.06 ml/g, and even more preferably less than 0.04 ml/g, preferably the ratio between the volume V5, measured by mercury porosimetry, comprised between $D_{mean}$−15 Å and $D_{mean}$+15 Å, to the volume V2, measured by mercury porosimetry, comprised between $D_{mean}$−30 Å and $D_{mean}$+30 Å, is more than 0.6, more preferably more than 0.7, and even more preferably more than 0.8, preferably the volume V6 contained in the pores of diameters greater than $D_{mean}$+15 Å and measured by mercury porosimetry, is less than 0.2 ml/g, preferably less than 0.1 ml/g, and even more preferably less than 0.05 ml/g, the total pore volume, measured by mercury porosimetry, is comprised between 0.1 ml/g and 0.6 ml/g, preferably comprised between 0.20 and 0.50 ml/g, and even more preferably more than 0.20 ml/g, the total pore volume, measured by nitrogen adsorption, is comprised between 0.1 ml/g and 0.6 ml/g, preferably comprised between 0.20 and 0.50 ml/g, the BET specific surface area is comprised between 100 and 550 m$^2$/g, preferably comprised between 150 and 500 m$^2$/g, preferably the adsorption surface is such that the ratio between the adsorption surface and the BET surface area is more than 0.5, more preferably more than 0.65, and even more preferably more than 0.8, the pore volume, measured by mercury porosimetry, contained in the pores of diameter greater than 140 Å, is less than 0.1 ml/g, preferably less than 0.05 ml/g, and even more preferably less than 0.03 ml/g, the pore volume, measured by mercury porosimetry, contained in the pores of diameter greater than 160 Å, is less than 0.1 ml/g, preferably less than 0.05 ml/g, and even more preferably less than 0.025 ml/g, the pore volume, measured by mercury porosimetry, contained in the pores of diameter greater than 200 Å, is less than 0.1 ml/g, preferably less than 0.05 ml/g, and even more preferably less than 0.025 ml/g, the pore volume, measured by mercury porosimetry, contained in the pores with diameters greater than 500 Å, is less than 0.01 ml/g, the X-ray diffraction diagram contains at least the main lines characteristic of at least one of the transition aluminas included in the group composed of alpha, rho, chi, kappa, eta, gamma, theta and delta aluminas, and preferably characterised in that it contains at least the main lines characteristic of at least one of the transition aluminas contained in the group composed of gamma, eta, theta and delta alumina, and more preferably characterised in that it contains at least the main lines characteristic of gamma and eta alumina, and even more preferably characterised in that it contains peaks with a d value comprised between 1.39 and 1.40 Å and with a d value comprised between 1.97 Å and 2.00 Å.

The NMR MAS spectra of the $^{27}$Al solid of the matrix show two distinct clusters of peaks. A first type of aluminium whose maximum resonates around 10 ppm extends between −100 and 20 ppm. The position of the maximum suggests that these species are essentially of the type $Al_{VI}$ (octahedral). A second type of minority aluminium whose maximum resonates around 60 ppm extends between 20 and 110 ppm. This cluster can be broken down into at least two species. The predominant species in this cluster corresponds to atoms of $Al_{IV}$ (tetrahedral). For the substrates and catalysts of the present invention, advantageously, the proportion of octahedral $Al_{VI}$ is more than 50%, preferably more than 60%, and even more preferably more than 70%.

In an embodiment of the invention, the matrix contains at least two silica-alumina zones, said zones having Si/Al ratios that are less than or greater than the overall Si/Al ratio determined by X-ray fluorescence. A matrix according to the present invention having an overall Si/Al ratio equal to 0.5 includes for example two silica-alumina zones, one of the zones has an Si/Al ratio determined by TEM that is less than 0.5 and the other zone has an Si/Al ratio determined by TEM that is comprised between 0.6 and 2.5.

In another embodiment of the invention, the matrix contains a single silica-alumina zone having an Si/Al ratio equal to the overall Si/Al ratio determined by X-ray fluorescence and less than 2.3.

The acidity of the matrix according to the invention can advantageously be measured, without thereby restricting the scope of the invention, by IR tracking of the thermodesorption of pyridine. Generally, the B/L ratio, as described above, of the matrix according to the invention is between 0.05 and 1, preferably between 0.05 and 0.7, very preferably between 0.06 and 0.3, and even more preferably between 0.075 and 0.15.

Preparation Methods

Matrix

The applicant discovered that the silica-alumina-matrix based zeolitic substrates obtained from a mixture at any arbitrary stage of an alumina compound that is partially soluble in acid medium with a totally soluble silica compound or with a totally soluble combination of hydrated alumina and silica, with shaping followed by a hydrothermal or thermal treatment so as to homogenise it on the micrometer scale, and even on the nanometer scale, make it possible to obtain a catalyst that is particularly active in hydrocracking processes. The expression partially soluble in acid medium is understood by the applicant to mean that placing the alumina compound in contact with an acid solution, for example nitric acid or sulphuric acid, before any addition of the totally soluble silica compound or the combination, causes the partial dissolution thereof.

Sources of Silica

The silica compounds used according to the invention can have been selected from the group that is formed by silicic acid, silicic acid sols, water-soluble alkaline silicates, cationic silicon salts, for example hydrated sodium metasilicate, Ludox® in ammoniacal form or in alkaline form, and quaternary ammonium silicates. Silica sol can be prepared according to one of the methods known to the person skilled in the art. A decationised orthosilicic acid solution is preferably prepared from a water-soluble alkaline silicate by ion exchange on a resin.

Sources of Totally Soluble Silica-Aluminas

The totally soluble hydrated silica-aluminas used according to the invention can be prepared by true coprecipitation under controlled steady-state operating conditions (pH, concentration, temperature, average dwell time) by reacting a basic solution containing silicon, for example in the form of sodium silicate, optionally aluminium, for example in the form of sodium aluminate, with an acid solution containing at least one aluminium salt, for example aluminium sulphate. At least one carbonate or $CO_2$ can optionally be added to the reaction medium.

The expression true coprecipitation is understood by the applicant to mean a process whereby at least one aluminium compound that is totally soluble in a basic or acid medium as described below, and at least one silicon compound as described below are brought into contact, simultaneously or sequentially, in the presence of at least one precipitating and/or coprecipitating compound so as to obtain a mixed phase that essentially consists of hydrated silica-alumina that is optionally homogenised by intense stirring, shearing, colloidal grinding or by a combination of these unitary operations. For example, these hydrated silica-aluminas can have been prepared according to the teachings of U.S. Pat. No. 2,908,635; U.S. Pat. No. 3,423,332, U.S. Pat. No. 3,433,747, U.S. Pat. No. 3,451,947, U.S. Pat. No. 3,629,152, U.S. Pat. No. 3,650,988.

The total dissolution of the silica compound or the combination was evaluated approximately according to the following method. A fixed amount (15 g) of the silica compound or the hydrated combination is introduced into a preset pH medium. The concentration of solid added per liter of suspension is preferably 0.2 mole per liter. The pH of the dispersion solution is at least 12 and it can be obtained by use of an alkaline source. Preferably it is advantageous to use NaOH. The mixture is then stirred mechanically by a deflocculant-type turbine stirring mechanism for 30 minutes at 800 rpm. Once the stirring is completed, the mixture is centrifuged for 10 minutes at 3000 rpm. The cake is separated from the supernatant liquid. The solution was filtered on a filter with a porosity of 4 and a diameter of 19 cm. Drying followed by calcining at 1000° C. of the two fractions are then carried out. An equal ratio R is then defined by dividing the decanted mass by the mass of solid in suspension. Totally soluble is understood to mean a ratio R that is at least higher than 0.9.

Sources of Alumina

The alumina compounds used according to the invention are partially soluble in acid medium. They are selected wholly or partially from the group of alumina compounds of general formula $Al_2O_3,nH_2O$. It is possible in particular to use hydrated alumina compounds such as: hydrargillite, gibbsite, bayerite, boehmite, pseudo-boehmite, and amorphous or essentially amorphous alumina gels. It is also possible to use the dehydrated forms of these compounds that consist of transition aluminas and that include at least one of the phases included in the group: rho, chi, eta, gamma, kappa, theta, and delta, which differ essentially by the organisation of their crystalline structure. The alpha-alumina that is commonly called corundum can be incorporated in a small proportion into the substrate according to the invention.

This property of partial dissolution is a desired property of the invention; it applies to hydrated alumina powders, to sprayed hydrated alumina powders, to dispersions or suspensions of hydrated alumina or to any combination thereof, before any addition of a compound wholly or partially containing silicon.

The partial dissolution of the alumina compound was evaluated approximately according to the following method. A precise amount of the alumina compound in powder or suspension form is introduced into a preset pH medium. The mixture is then stirred mechanically. Once the stirring is completed, the mixture is left without stirring for 24 hours. Preferably, the concentration of $Al_2O_3$ solid added per liter of suspension is 0.5 mole per liter. The pH of the dispersion solution is 2 and is obtained by the use of $HNO_3$, HCl, or $HClO_4$. Preferably it is advantageous to use $HNO_3$. The distribution of sedimented and dissolved fractions was determined by measuring the aluminium by UV absorption. The supernatants were ultrafiltered (polyether sulphone membrane, Millipore NMWL: 30 000) and digested in concentrated acid. The amount of aluminium in the supernatant corresponds to the non-sedimented alumina compound and the dissolved aluminium, and the ultrafiltered fraction corresponds to the dissolved aluminium only. The amount of sedimented particles is derived from the theoretical concentration of aluminium in the dispersion (by considering that all of the solid that is introduced is dispersed) and from the amounts of boehmite actually dispersed and aluminium in solution.

The alumina precursors used according to the present invention are therefore distinguished from those that are used in the case of true co-precipitations, which are entirely soluble in acid medium: cationic alumina salts, for example aluminium nitrate. The methods that are part of the invention are distinguished from true co-precipitations in that one of the elements, in this case the aluminium compound, is partially soluble.

To use the alumina, any alumina compound of general formula $Al_2O_3,nH_2O$ can be used. Its specific surface area is between 150 and 600 $m^2/g$. It is possible in particular to use hydrated alumina compounds such as: hydrargillite, gibbsite, bayerite, boehmite, pseudo-boehmite, and amorphous or essentially amorphous alumina gels. It is also possible to use the dehydrated forms of these compounds that consist of transition aluminas and that include at least one of the phases included in the group: rho, chi, eta, gamma, kappa, theta, and delta, which differ essentially by the organisation of their crystalline structure. During heat treatments, these different forms are liable to evolve among themselves, according to a complex relationship that depends on the treatment operating conditions. It is also possible to use, in measured proportions, the alpha-alumina commonly known as corundum.

The aluminium hydrate $Al_2O_3,nH_2O$ used is more preferably boehmite, pseudo-boehmite and the amorphous or essentially amorphous alumina gels. A mixture of these products in any arbitrary combination can also be used.

Boehmite is generally described as an aluminium monohydrate of formula $Al_2O_3,nH_2O$ that in reality includes a broad continuum of materials with variable degrees of hydration and organisation with more or less well-defined boundaries: the most hydrated gelatinous boehmite, in which n can be more than 2, pseudo-boehmite or microcrystalline boehmite with n comprised between 1 and 2, then crystalline boehmite, and finally well crystallised boehmite with large crystals with n close to 1. The morphology of aluminium monohydrate can vary within broad limits between these two extreme acicular or prismatic forms. A whole range of variable forms can be used between these two forms: chains, boats, interlaced platelets.

The preparation and/or the shaping of the aluminium hydrate thus can constitute the first stage in the preparation of these catalysts. The preparation and/or the shaping of transition-alumina-based substrates derived from aluminium monohydrate is disclosed in numerous patents: U.S. Pat. No. 3,520,654; U.S. Pat. No. 3,630,670; U.S. Pat. No. 3,864,461; U.S. Pat. No. 4,154,812; U.S. Pat. No. 4,313,923; DE 3243193; U.S. Pat. No. 4,371,513.

Relatively pure aluminium hydrates can be used in the form of amorphous or crystallised powder or crystallised powder containing an amorphous portion. Aluminium hydrate can also be introduced in the form of aqueous suspensions or dispersions. The aqueous suspensions or dispersions of aluminium hydrate used according to the invention can have the ability to gel or solidify. The aqueous dispersions or suspensions can also be obtained, as is well known to the person skilled in the art, by peptization in water or water that is acidified with aluminium hydrates.

The dispersion of aluminium hydrate can be carried out by any process that is known to the person skilled in the art: in a batch reactor, a continuous mixer, a mixing machine, or a colloidal mill. Such mixing can be also be carried out in a piston flow reactor and, in particular, in a static mixer. Mention may be made of Lightnin reactors.

In addition, it is also possible to use as an alumina source an alumina that has been subjected in advance to a treatment that can improve its degree of dispersion. By way of example, it is possible to improve the dispersion of the alumina source by a preliminary homogenisation treatment. For homogenisation, it is possible to use at least one of the homogenisation treatments described in the following text.

The aqueous dispersions or suspensions of alumina that can be used are, in particular, aqueous suspensions or dispersions of fine or ultra-fine boehmites that consist of particles having dimensions in the colloidal range.

The fine or ultra-fine boehmites used according to the present invention can have been obtained in particular according to French Patents FR-1 261 182 and FR-1 381 282 or according to European Patent Application EP 15 196.

It is also possible to use aqueous suspensions or dispersions obtained from pseudo-boehmite, amorphous alumina gels, aluminium hydroxide gels or ultra-fine hydrargillite gels.

Aluminium monohydrate can be purchased from a variety of commercial sources of alumina, such as, in particular, PURAL®, CATAPAL®, DISPERAL®, and DISPAL® marketed by SASOL, or HIQ® marketed by ALCOA, or according to methods that are known to the person skilled in the art: it can be prepared by partial dehydration of aluminium trihydrate by conventional methods or it can be prepared by precipitation. When these aluminas are presented in the form of a gel, they are peptized by water or an acidified solution. In the case of precipitation, the acid source can be selected, for example, from at least one of the following compounds: aluminium chloride, aluminium sulphate, or aluminium nitrate. The basic aluminium source can be selected from the basic aluminium salts such as sodium aluminate and potassium aluminate.

Sodium hydroxide, sodium carbonate, potassium and ammonia can be used as precipitating agents. The precipitating agents are selected such that the alumina source according to the present invention and these agents are precipitated together.

Depending on the acidic or basic nature of the aluminium-based starting compound, the aluminium hydrate is precipitated with the aid of a base or an acid that is selected, for example, from hydrochloric acid, sulphuric acid, soda or a basic or acidic compound of aluminium as cited above. The two reagents can be aluminium sulphate and sodium aluminate. For an example of preparation of aluminium alpha-monohydrate that uses aluminium sulphate and soda aluminate, reference may be made in particular to U.S. Pat. No. 4,154,812.

In particular, pseudo-boehmite can have been prepared according to the process described in U.S. Pat. No. 3,630,670 by reacting an alkaline aluminate solution with a mineral acid solution. In particular, pseudo-boehmite can have been prepared according to the process described in U.S. Pat. No. 3,630,670 by reacting an alkaline aluminate solution with a mineral acid solution. It can also have been prepared as described in French Patent FR 1 357 830.

In particular, the amorphous alumina gels can have been prepared according to the processes described in the article "Alcoa Paper No. 19 (1972) pages 9 to 12" and in particular by reacting acid aluminate or an aluminium salt or by hydrolysis of aluminium alcoholates or by hydrolysis of basic aluminium salts.

The aluminium hydroxide gels can be in particular those that have been prepared according to the processes described in U.S. Pat. No. 3,268,295 and U.S. Pat. No. 3,245,919.

In particular, the aluminium hydroxide gels may be those prepared according to the processes described in Patent WO 00/01617, by mixing an aluminium acid source and a base or an aluminium basic source and an acid so as to precipitate an alumina monohydrate, the following steps being:

2. maturation
3. filtration
4. washing, and
5. drying, processes characterised in that the mixing at step one is carried out without retromixing.

The ultrafine hydrargillite can have been prepared according to the process described in U.S. Pat. No. 1,371,808 by evolving toward a temperature comprised between ambient temperature and 60° C. for alumina gels in cake form and containing 0.1 monovalent acid ions relative to the alumina, counted in $Al_2O_3$ molecules.

It is also possible to use ultra-pure aqueous suspensions or dispersions of boehmite or pseudo-boehmite prepared according to a process in which an alkaline aluminate is reacted with carbonic anhydride to form an amorphous aluminium hydroxycarbonate precipitate, the precipitate obtained by filtration is separated, and the latter is then washed (the process is described in particular in U.S. Pat. No. 3,268,295).

Then, a) in a first step, the precipitate washed with amorphous aluminium hydroxycarbonate is mixed with an acid solution, a base or a salt or mixtures thereof; this mixing is carried out by pouring the solution over the hydroxycarbonate, the pH of the medium thus constituted being less than 11, b) in a second step, the reaction medium thus constituted is heated to a temperature of less than 90° C. for a period of at least 5 minutes, c) in a third step, the medium resulting from the second step is heated to a temperature between 90° C. and 250° C.

The boehmite and pseudo-boehmite dispersions or suspensions obtained according to this process exhibit an alkalines content of less than 0.005% expressed in the form of a ratio by weight of alkaline metal oxide/$Al_2O_3$.

When it is desired to produce very pure catalyst substrates, ultra-pure boehmite or pseudo-boehmite suspensions or dispersions are preferably used that have been obtained according to the process described above, or the aluminium hydroxide gels that were prepared from the hydrolysis of aluminium alcoholates according to a process of the type described in U.S. Pat. No. 2,892,858.

The production process that leads to such boehmite-type aluminium hydroxide gels obtained as a by-product in the production of alcohol by hydrolysis of an alcoholate or alkoxide of aluminium (Ziegler synthesis) is briefly described. The Ziegler alcohol synthesis reactions are described in particular in U.S. Pat. No. 2,892,858. According to this process, firstly triethyl aluminium is prepared from aluminium, hydrogen and ethylene, whereby the reaction is carried out in two stages with partial recycling of triethyl aluminium.

Ethylene is added in the polymerisation stage, and the product obtained is then oxidised to aluminium alcoholate, the alcohols being obtained by hydrolysis.

The aluminium hydroxide gels can also be those prepared according to the processes described in U.S. Pat. No. 4,676,928-A and U.S. Pat. No. 6,030,599.

The hydrated alumina obtained as a by-product of the Ziegler reaction is described in particular in a report by the company CONOCO dated 19$^{th}$ Jan. 1971.

The dimension of the alumina particles that constitute the alumina source can vary within wide limits. It is generally between 1 and 100 microns.

Methods of Preparing the Matrix

The matrix can be advantageously prepared by one of the methods described below.

By way of example, a method of preparing a silica-alumina that is part of the invention consists in preparing, from a water-soluble alkaline silicate, an orthosilicic acid solution ($H_2SiO_4, H_2O$) that is decationised by ion exchange, then in simultaneously adding it to a cationic aluminium salt in solution, for example, nitrate, and to ammonia under controlled operating conditions; or else adding the orthosilicic acid solution to the cationic aluminium salt in solution and coprecipitating the solution obtained by ammonia under controlled operating conditions leading to a homogeneous product. This silica-alumina hydrogel is mixed with an aluminium hydrate powder or suspension. After filtering and washing, drying with shaping followed by calcining, preferably in air, in a rotary kiln, at a high temperature and for a sufficient period to promote interactions between the alumina and the silica, generally at least two hours, a matrix that fulfils the characteristics of the invention is obtained.

Another method of preparing silica-alumina according to the invention consists in precipitating the alumina hydrate as above, in washing it, then in mixing it with aqueous orthosilicic acid so as to obtain a suspension, which is thoroughly homogenised by vigorous stirring and shearing. An Ultraturrax turbine or else a Staro turbine can be used, or else a colloidal mill, for example a Staro colloidal mill. The homogeneous suspension is then dried by spraying as above, then calcined between 500 and 1200° C. for at least three hours: a silica-alumina matrix that can be used in the process according to the invention is obtained.

Another method that is part of the invention consists in preparing as above a decationised solution of orthosilicic acid then in adding it simultaneously or consecutively to an alumina compound, for example an aluminium hydrate in powdered form or in an acidified suspension form. To increase the diameter of the pores of the final silica-alumina substrate, at least one basic compound can optionally be added to the reaction medium. After intense homogenisation of the suspension by stirring, optional adjustment by filtration of the content of dry material then optionally rehomogenisation, the product is dried with simultaneous or consecutive shaping, then calcined as above.

Another method that is also part of the invention consists in preparing an aqueous alumina suspension or dispersion, for example an aluminium monohydrate, then in adding it simultaneously or consecutively to a silica compound, for example a sodium silicate. To increase the diameter of the pores of the final silica-alumina matrix, at least one basic compound can optionally be added to the reaction medium. The matrix is obtained by filtration and washing, optionally washing by an ammonia solution to extract the residual sodium by ion exchange, drying with simultaneous or consecutive shaping. After drying with shaping, then calcining as above, a substrate that fulfils the characteristics of the invention is obtained. The size of the alumina particles used is preferably between 1 and 100 microns to obtain a good homogenisation of the silica-alumina substrate according to the invention.

To increase the diameter of the mesopores of the silica-alumina matrix, it can be particularly advantageous, as taught by U.S. Pat. No. 4,066,574, to prepare an aqueous alumina suspension or dispersion, for example an aluminium monohydrate, and then to neutralise by a basic solution, for example ammonia, then to add it simultaneously or consecutively to a silica compound, for example a decationised orthosilicic acid solution. After intensive homogenisation of the suspension by vigorous stirring, optional adjustment by filtration of the dry material content then rehomogenisation, the product is dried with simultaneous or consecutive shaping, then calcined as above. This method is also part of the methods that are used according to the invention.

In the presentation of the above-mentioned methods, the term homogenisation is used to describe putting back into solution a product that contains a solid fraction, for example a suspension, a powder, a filtered precipitate, then dispersing it by vigorous stirring. The homogenisation of a dispersion is a process well known to the person skilled in the art. Said homogenisation can be carried out by any method known to the person skilled in the art: by way of example, in a batch reactor, a continuous mixer, or a mixing machine. Such mixing can be carried out in a piston flow reactor and in particular in a static reactor. Mention may be made of Lightnin reactors. An Ultraturrax® turbine or else a Staro® turbine can be used, or else a colloidal mill, for example a Staro colloidal mill. Commercial colloidal mills by IKA® can also be used.

In all of the above-mentioned methods, it may optionally be desirable to add, during any arbitrary stage of the preparation, a minor proportion of at least one stabilising element selected from the group formed by zirconia and titania. The stabilising element is preferably added in the form of a soluble salt.

The acidity of the matrix according to the invention can advantageously be measured, without thereby restricting the scope of the invention, by IR tracking of the thermodesorption of pyridine. Generally, the B/L ratio of the matrix according to the invention is between 0.05 and 1, preferably between 0.05 and 0.7, very preferably between 0.06 and 0.3, and even more preferably between 0.075 and 0.15.

Zeolite

Zeolites are generally beneficial in improving the conversion performance of the catalyst. Any zeolite known for its performance in hydrocracking and/or hydroconversion can be used in the substrates and catalysts object of the invention.

In an embodiment of the invention, but without thereby restricting the scope of the invention, Y zeolites with faujasite type structure (Zeolite Molecular Sieves Structure Chemistry and Uses, D. W. Breck, J. WILLEY and Sons, 1973) which can be in hydrogen form or partially exchanged with metal cations, for example with the aid of cations of alkaline-earth metals and/or of rare earths of atomic number 57 to 71 inclusive, are used. Y zeolites that have undergone secondary treatment also form part of the invention. The expression secondary treatment is understood in particular to mean the treatments described in: "Hydrocracking. Science and Technology", J. Scherzer, A. J. Gruia, 1996 or in R. J. Beyerlein or in [text missing? translator]. Y zeolites are prepared for example according to generally used techniques by dealumination.

The Y zeolites generally used in hydrocracking catalysts are manufactured by modifying commercially available Na-Y zeolite. This modification yields zeolites that are described as stabilised, ultra-stabilised (USY), very ultrastabilised (VUSY) or dealuminated (SDUSY). This description is common in the literature but it does not thereby restrict the characteristics of the zeolites of the present invention to such a designation. This modification is accomplished by combining three types of operations known to the person skilled in the art: hydrothermal treatment, ion exchange and acid etching. Hydrothermal treatment is perfectly defined by the combination of operating variables including temperature, duration, total pressure and partial pressure of water vapour. The effect of this treatment is to extract aluminium atoms from the silica-alumina structure of the zeolite. The consequence of this treatment is an increase in the $SiO_2/Al_2O_3$ molar ratio of the structure and a reduction of the crystalline lattice parameter.

Ion exchange generally takes place by immersing the zeolite in an aqueous solution containing ions capable of fixing on the cationic exchange sites of the zeolite. The sodium cations present in the zeolite after crystallisation are thus removed. The acid etching operation involves contacting the zeolite with an aqueous solution of a mineral acid. The severity of acid etching is adjusted by the acid concentration, the duration and the temperature. When carried out on a hydrothermally treated zeolite, this treatment has the effect of eliminating the alumina species extracted from the structure and which block the microporosity of the solid.

Furthermore, a particular hydrothermal treatment such as that described in patent application U.S. Pat. No. 5,601,798 has the effect of increasing the mesoporosity of the Y, USY, VUSY and SDUSY zeolites, which zeolites are particularly advantageous in combination with the amorphous matrix described above.

Different Y zeolites can advantageously be used.

In a preferred embodiment of the invention, a particularly advantageous H—Y acid zeolite is characterised by different specifications: an overall $SiO_2/Al_2O_3$ molar ratio between about 6 and 70 and preferably between about 12 and 50; a sodium content less than 0.15% by weight determined on the zeolite calcined at 1100° C.; a lattice parameter "a" of the unit cell between $24.58 \times 10^{-10}$ m and $24.24 \times 10^{-10}$ m and preferably between $24.38 \times 10^{-10}$ m and $24.26 \times 10^{-10}$ m; a sodium ion take-up capacity CNa, expressed in grams of Na per 100 grams of modified zeolite, neutralised then calcined, of over about 0.85; a specific surface area determined by the BET method of more than about 400 m$^2$/g and preferably more than 550 m$^2$/g; a water vapour adsorption capacity at 25° C. for a partial pressure of 2.6 torrs (that is 34.6 MPa) of more than about 6%; and advantageously, the zeolite has a pore distribution, determined by nitrogen physisorption, including between 5 and 45% and preferably between 5 and 40% of the total pore volume of the zeolite contained in pores of diameter between $20 \times 10^{-11}$ m and $80 \times 10^{-11}$ m, and between 5 and 45% and preferably between 5 and 40% of the total pore volume of the zeolite contained in pores of diameter greater than $80 \times 10^{-11}$ m and generally less than $1000 \times 10^{-11}$ m, the rest of the pore volume being contained in the pores of diameter less than $20 \times 10^{-11}$ m.

A preferred catalyst using this type of zeolite contains a silica-alumina matrix, at least one dealuminated Y zeolite and having a lattice parameter between 2.424 nm and 2.455 nm, preferably between 2.426 and 2.438 nm, an overall $SiO_2/Al_2O_3$ molar ratio of more than 8, a content of alkaline-earth or alkaline metal cations and/or of rare earth cations such that the atomic ratio $(n \times M^{n+})/Al$ is less than 0.8, preferably less than 0.5 or less than 0.1, a specific surface area determined by the BET method of more than 400 m$^2$/g, preferably more than 550 m$^2$/g, and a water adsorption capacity at 25° for a P/Po value of 0.2, of more than 6% by weight, said catalyst also including at least one hydro-dehydrogenating metal, and silicon deposited on the catalyst.

In an advantageous embodiment according to the invention, a partially amorphous Y zeolite is used.

The expression partially amorphous Y zeolite is understood to mean a solid having:

i) a peak ratio that is less than 0.40 preferably less than about 0.30;

ii) a crystalline fraction expressed relative to a reference Y zeolite in sodium form (Na) that is less than about 60%, preferably less than about 50%, and determined by X-ray diffraction.

Preferably, the solid partially amorphous Y zeolites included in the composition of the catalyst according to the invention have at least one (and preferably all) of the other following characteristics:

iii) an overall Si/Al ratio of more than 15, preferably more than 20 and less than 150, iv) an $Si/Al_{IV}$ ratio of the structure greater than or equal to the overall Si/Al ratio, v) a pore volume at least equal to 0.20 ml/g of solid of which a fraction, comprised between 8% and 50%, is constituted by pores having a diameter of at least 5 nm (nanometer), that is 50 Å;

vi) a specific surface area of 210-800 m$^2$/g, preferably 250-750 m$^2$/g and advantageously 300-600 m$^2$/g.

The peak ratio of a conventional USY zeolite is 0.45 to 0.55, its crystalline fraction relative to a perfectly crystallised NaY is 80 to 95%. The peak ratio of the solid being the object of the present description is less than 0.4 and preferably less than 0.35. Its crystalline fraction is therefore less than 70%, preferably less than 60%.

The partially amorphous zeolites are prepared by the techniques generally used for dealumination, from commercially available Y zeolites, that is to say those that generally have high crystallinities (at least 80%). More generally it is possible to start with zeolites having a crystalline fraction of at least 60%, or at least 70%.

The Y zeolites generally used in hydrocracking catalysts are manufactured by modifying commercially available Na-Y zeolites. This modification yields zeolites that are referred to as stabilised, ultra-stabilised or dealuminated. This modification is accomplished by at least one of the techniques of dealumination, and for example hydrothermal treatment, acid etching. Preferably, this modification is accomplished by combining three types of operations known to the person skilled in the art: hydrothermal treatment, ion exchange and acid etching.

Another particularly advantageous zeolite is a globally non-dealuminated and highly acid zeolite.

The expression globally non-dealuminated zeolite is understood to mean a Y zeolite (structure type FAU, faujasite) according to the nomenclature developed in "Atlas of zeolites structure types", W. M. Meier, D. H. Olson and Ch. Baerlocher, 4$^{th}$ revised Edition 1996, Elsevier. The lattice parameter of this zeolite may have decreased due to the extraction of aluminiums from the structure or during preparation, but the overall $SiO_2/Al_2O_3$ ratio will not have changed as the aluminiums were not extracted chemically. Such a globally non-dealuminated zeolite therefore has a silicon and aluminium composition expressed by the overall $SiO_2/Al_2O_3$ ratio equivalent to the initial non-dealuminated Y zeolite. The parameter values ($SiO_2/Al_2O_3$ and lattice parameter) are given below. This globally non-dealuminated Y zeolite can either be in the hydrogen form or can be at least partially exchanged with metal cations, for example with the aid of cations of alkaline-earth metals and/or cations of rare earth metals of atomic number 57 to 71 inclusive. A zeolite devoid of rare earths and alkaline earths will be preferred, and similarly for the catalyst.

The globally non-dealuminated Y zeolite generally has a lattice parameter greater than 2.438 nm, an overall $SiO_2/Al_2O_3$ ratio less than 8, a structure $SiO_2/Al_2O_3$ molar ratio less than 21 and greater than the overall $SiO_2/Al_2O_3$ ratio. An advantageous catalyst combines this zeolite with a phosphorus-doped matrix.

Globally non-dealuminated zeolite can be obtained by any treatment that does not extract aluminium from the sample, such as for example water vapour treatment, and $SiCl_4$ treatment.

In another preferred embodiment of the invention, the substrate includes a zeolite as described in U.S. Pat. No. 5,601,978. These zeolites are described in particular in column 30, lines 48-64. Their mesopore volume is in particular more than 0.202 cm$^3$/g for a mesh parameter comprised between 24.5 Å and 24.6 Å and more than 0.313 cm$^3$/g for a mesh parameter comprised between 24.3 and 24.5 Å.

In a preferred embodiment of the invention, a zeolite selected from the group formed by the zeolites ZSM-48, ZBM-30, EU-2, EU-11, alone or in a mixture with another zeolite, can be used. Preferably, the zeolites ZSM-48 and ZBM-30 are considered. Even more preferably, the zeolite ZBM-30, preferably synthesised according to the procedure described in the patent (EP-A-46504), will be considered.

In another embodiment of the invention, the zeolite is a zeolite selected from the group formed by the zeolites Mordenite, Beta, NU-87, EU-1, preferably the zeolite MOR, used alone or in a mixture with other zeolites.

The preparation and the treatment(s) and also the shaping of the zeolite can thus constitute a stage in the preparation of these catalysts.

Introduction of the zeolite can be accomplished by any technique known to the person skilled in the art during the preparation of the matrix or during the shaping of the substrate.

Preparation of the Catalyst

The catalysts according to the invention can be prepared according to all of the methods well known to the person skilled in the art.

A preferred method of preparing the catalyst according to the present invention includes the following steps:

The zeolite can be introduced by any method known to the person skilled in the art and at any stage in the preparation of the substrate or of the catalyst.

In a preferred mode of preparation, the zeolite can be introduced during the synthesis of the matrix precursors. Without being limitative, the zeolite can for example be in the form of powder, ground powder, suspension, or suspension that has undergone a deagglomeration treatment. Thus, for example, the zeolite can be placed in an acidified or non-acidified suspension at a concentration adjusted to the final target content of zeolite on the substrate. This suspension commonly referred to as a slurry is then mixed with the precursors of the matrix at any arbitrary stage in the synthesis thereof as described above.

In another preferred mode of preparation, the zeolite can be introduced during the shaping of the substrate with the elements constituting the matrix with optionally at least one binder. Without being limitative, the zeolite can for example be in the form of powder, ground powder, suspension, or suspension that has undergone a deagglomeration treatment.

The elements of groups VIB and/or VIII, and optionally those selected from phosphorus, boron, silicon and optionally the elements of groups VB, and VIIB can be optionally introduced at this stage in the preparation of the catalyst by any method known to the person skilled in the art, they can also be introduced after shaping of the substrate and after or before drying and calcining of the substrate.

The hydrogenating element can be introduced at any stage of the preparation, preferably during mixing, or very preferably after shaping. The shaping is followed by a calcination, and the hydrogenating element can also be introduced before or after this calcination. The preparation generally ends by calcination at a temperature of 250 to 600° C. Another one of the preferred methods according to this invention consists in shaping the silica-alumina without a binder after mixing of the latter, optionally with the zeolite, then in passing the paste thus obtained through a die to form extrudates with a diameter of between 0.4 and 4 mm. The hydrogenating function can then be introduced in part only (case, for example, of combinations of metal oxides of groups VIB and VIII), or completely, at the time of mixing. It can also be introduced by one or more ion exchange operations on the calcined substrate that consists of at least one silica-alumina, optionally shaped with a binder, with the aid of solutions that contain the precursor salts of metals that are selected when the latter belong to group VIII. It can also be introduced by one or more operations for impregnation of the substrate that is shaped and calcined by a solution of the precursors of the metal oxides of groups VIII (in particular cobalt and nickel) when the precursors of the metal oxides of group VIB (in particular molybdenum or tungsten) were previously introduced at the time of mixing of the substrate. It can finally also be introduced, very preferably, by one or more operations for impregnation of the calcined substrate that consists of at least one zeolite and at least one silica-alumina according to the invention and optionally at least one binder, by solutions that contain the precursors of metal oxides of groups VI and/or VIII, whereby the precursors of the metal oxides of group VIII are preferably introduced after those of group VIB or at the same time as the latter.

In a preferred way, the substrate is impregnated by an aqueous solution. The impregnation of the substrate is preferably carried out by the so-called "dry" impregnation method that is well known to the person skilled in the art. The impregnation can be carried out in a single stage by a solution that contains all of the constituent elements of the final catalyst.

The catalyst of the present invention can therefore contain at least one element of group VIII, such as iron, cobalt, nickel, ruthenium, rhodium, palladium, osmium, iridium or platinum. Among the metals of group VIII, it is preferred to use a metal that is selected from the group formed by iron, cobalt, nickel, platinum, palladium and ruthenium. The catalyst according to the invention can also contain at least one element of group VIB, preferably tungsten and molybdenum. In an advantageous manner, the following metal combinations are used: nickel-molybdenum, cobalt-molybdenum, iron-molybdenum, iron-tungsten, nickel-tungsten, cobalt-tungsten, platinum-palladium; the preferred combinations are: nickel-molybdenum, cobalt-molybdenum, cobalt-tungsten and even more advantageously platinum-palladium and nickel-tungsten. It is also possible to use combinations of three metals for example nickel-cobalt-molybdenum, nickel-cobalt-tungsten. Advantageously, the following combinations of metals are used: nickel-niobium-molybdenum, cobalt-niobium-molybdenum, iron-niobium-molybdenum, nickel-niobium-tungsten, cobalt-niobium-tungsten, iron-niobium-tungsten, the preferred associations being: nickel-niobium-molybdenum, cobalt-niobium-molybdenum. It is also possible to use combinations of four metals for example nickel-cobalt-niobium-molybdenum. Combinations containing a noble metal such as ruthenium-niobium-molybdenum, or ruthenium-nickel-niobium-molybdenum, can also be used.

The following elements: boron and/or silicon and/or phosphorus and optionally the element(s) that are selected in group(s) VIIB and VB can be introduced into the catalyst at any level of the preparation and according to any technique that is known to the person skilled in the art.

A preferred method according to the invention consists in placing the doping element or elements that are selected, for example the boron-silicon pair, on the precursor which may or may not be calcined, but preferably is calcined. For this, an aqueous solution is prepared with at least one boron salt such as ammonium biborate or ammonium pentaborate in an alkaline medium and in the presence of oxygenated water, and a so-called dry impregnation is initiated, in which the volume of the pores of the precursor is filled by the solution that contains, for example, boron. In the case where silicon is also deposited, for example, a solution of a compound of silicone-type silicon or the emulsion type of silicone oil will be used.

The deposition of boron and silicon can also be carried out simultaneously by using, for example, a solution that contains a boron salt and a silicone-type silicon compound. Thus, for example, in the case where the precursor is a nickel-tungsten-type catalyst supported on silica-alumina, it is possible to impregnate this precursor by an aqueous solution of ammonium biborate and Rhodorsil E1P silicon from the Rhodia Company, to initiate a drying, for example, at 120° C., then to impregnate by an ammonium fluoride solution, to initiate a drying, for example at 120° C., and to initiate a calcination, for example, and preferably in air in a traversed bed, for example at 500° C. for 4 hours.

The doping element that is selected from the group that is formed by silicon, boron and phosphorus, and the elements of groups VIIB and VB can be introduced by one or more impregnation operations with excess solution on the calcined precursor.

When optionally at least one doping element, B and/or P and/or Si, is introduced, its distribution and its location can be determined by techniques such as the Castaing microprobe (distribution profile of the various elements), transmission electron microscopy combined with X-ray analysis of the components of the catalysts, or by mapping the distribution of the elements present in the catalyst using an electronic microprobe. These techniques make it possible to reveal the presence of these exogenous elements added after the synthesis of the silica-alumina according to the invention.

The source of boron can be boric acid, preferably orthoboric acid $H_3BO_3$, ammonium biborate or pentaborate, boron oxide, and boric esters. Boron can for example be introduced in the form of a mixture of boric acid, oxygenated water and a basic organic compound containing nitrogen such as ammonia, primary and secondary amines, cyclic amines, compounds of the pyridine and quinoleines family, and compounds of the pyrrole family. Boron can be introduced for example by a solution of boric acid in a water/alcohol mixture.

The preferred source of phosphorus is orthophosphoric acid $H_3PO_4$, but its salts and esters such as ammonium phosphates are also suitable. Phosphorus can for example be introduced in the form of a mixture of phosphoric acid and a basic organic compound containing nitrogen such as ammonia, primary and secondary amines, cyclic amines, compounds of the pyridine family and quinoleines, and compounds of the pyrrole family. Numerous sources of silicon can be used. Thus, it is possible to use ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and its salts, and silicotungstic acid and its salts can also be used advantageously. The silicon can be added by, for example, impregnation of ethyl silicate in solution in a water/alcohol mixture. The silicon can be added by, for example, impregnation of a silicon compound of silicone type or silicic acid that is suspended in water.

The group VIB and group VIII metals of the catalyst of the present invention can be present wholly or partially in metallic form and/or oxide form and/or sulphide form. For example, among the sources of molybdenum and tungsten, it is possible to use oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts.

The sources of elements of group VIII that can be used are well known to the person skilled in the art. For example, for the non-noble metals, nitrates, sulphates, phosphates, halides for example, chlorides, bromides and fluorides, carboxylates, for example acetates and carbonates, will be used. For the noble metals, halides, for example chlorides, nitrates, acids such as chloroplatinic acids, and oxychlorides, such as ammoniacal ruthenium oxychloride, will be used.

Preferably, no halogens are added other than that introduced during the impregnation, this halogen preferably being chlorine.

Shaping the Substrates and Catalysts

The substrate can be shaped by any technique known to the person skilled in the art. The shaping can be carried out, for example, by extrusion, by pelletising, by the drop (oil-drop) coagulation method, by turntable granulation or by any other method that is known to the person skilled in the art.

Shaping can also be carried out in the presence of various components of the catalyst and extrusion of the mineral paste that is obtained, by pelletising, shaping in the form of balls with a rotary former or with a drum, drop coagulation, oil-drop, oil-up or any other known process for agglomeration of a powder that contains alumina and optionally other ingredients that are selected from among those that are mentioned above.

The catalysts used according to the invention have the shape of spheres or extrudates. It is advantageous, however, that the catalyst comes in the form of extrudates with diameters of between 0.5 and 5 mm and more particularly between 0.7 and 2.5 mm. The shapes are cylindrical (which may or may not be hollow), twisted cylindrical, multilobar (2, 3, 4 or 5 lobes, for example), and rings. The cylindrical shape is preferably used, but any other shape may be used.

The packing density of the substrates, after calcination, is more than $0.65$ $g/cm^3$, preferably more than $0.72$ $g/cm^3$, very preferably more than $0.75$ $g/cm^3$, and even more preferably more than $0.78$ $g/cm^3$.

The packing density of the catalysts is more than $0.85$ $g/cm^3$, preferably more than $0.95$ $g/cm^3$, very preferably more than $1.025$ $cm^3/g$ [sic], and even more preferably more than $1.1$ $g/cm^3$.

Furthermore, these substrates that are used according to the present invention may have been treated, as is well known to the person skilled in the art, by additives to facilitate the shaping and/or to improve the final mechanical properties of the silica-alumina-matrix based substrates. By way of example of additives, it is possible to cite in particular cellulose, carboxymethyl-cellulose, carboxy-ethyl-cellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols, etc.

Adjustment of the characteristic porosity of the substrates of the invention is carried out partially during this shaping stage of the substrate particles.

The shaping can be carried out by using techniques for shaping the catalysts, known to the person skilled in the art, such as, for example: extrusion, coating, spray-drying or pelletising.

It is possible to add or to withdraw water to adjust the viscosity of the paste that is to be extruded. This step can be carried out at any stage in the mixing stage.

To adjust the content of solid material of the paste that is to be extruded so as to make it extrudable, it is also possible to add a compound that is solid for the most part and preferably an oxide or a hydrate. A hydrate will preferably be used, and even more preferably, an aluminium hydrate will be used. The loss on ignition (LOI) of this hydrate will be more than 15%.

The acid content added in the mixing before shaping is less than 30%, preferably between 0.5 and 20% by weight of the anhydrous silica and alumina mass that is engaged in the synthesis.

The extrusion can be carried out by any conventional tool, available commercially. The paste that is obtained from mixing is extruded through a die, for example with the help of a piston or a single or double-extrusion screw. This extrusion stage can be carried out by any method known to the person skilled in the art.

The substrate extrudates of the invention generally have a resistance to crushing of at least 70 N/cm and preferably greater than or equal to 100 N/cm.

Calcination of the Substrate

Drying is effected by any technique known to the person skilled in the art.

To obtain the substrate of the present invention, it is preferable to calcinate preferably in the presence of molecular oxygen, for example by carrying out a flushing with air, at a temperature less than or equal to 1100° C. At least one calcination can be carried out after any arbitrary stage of the preparation. This treatment can be performed, for example, in a traversed bed, in a swept bed or in static atmosphere. For example, the furnace used can be a rotary kiln or a vertical furnace with radial traversed layers. The calcination conditions: the temperature and duration depend mainly on the maximum temperature of use of the catalyst. The preferred conditions of calcination are between more than one hour at 200° C. and less than one hour at 1100° C. The calcination can be performed in the presence of water vapour. The final calcination can optionally be performed in the presence of an acidic or basic vapour. For example, the calcination can be performed under partial pressure of ammonia.

Post-Synthesis Treatments

Post-synthesis treatments can be carried out so as to improve the properties of the substrate, in particular its homogeneity as defined above.

In a preferred embodiment, the post-synthesis treatment is a hydrothermal treatment. The hydrothermal treatment is effected by any technique known to the person skilled in the art. Hydrothermal treatment is understood to mean placing the mixed substrate in contact with water in vapour phase or in liquid phase at any stage in the preparation. Hydrothermal treatment may in particular be understood to mean curing, steaming, autoclaving, calcination in moist air, and rehydration. Without restricting the scope of the invention, such a treatment has the effect of rendering the silica component mobile.

According to the invention, curing can take place before or after shaping. In a preferred mode of the invention, the hydrothermal treatment is performed by steaming in a kiln in the presence of water vapour. The temperature during steaming can be between 600 and 1100° C. and preferably more than 700° C. for a period of time between 30 minutes and 3 hours. The content of water vapour is more than 20 g of water per kg of dry air and preferably more than 40 g of water per kg of dry air and preferably more than 100 g of water per kg of dry air. Such a treatment can, where appropriate, wholly or partly replace the calcination treatment.

According to the invention, the substrate can thus be optionally subjected to a hydrothermal treatment in a confined atmosphere. Hydrothermal treatment in a confined atmosphere is understood to mean a treatment by autoclaving in the presence of water at a temperature higher than ambient temperature.

During this hydrothermal treatment, it is possible to treat the shaped silica-alumina or shaped substrate (matrix+zeolite) in different ways. Thus, it is possible to impregnate the silica-alumina or the substrate with acid, prior to its autoclave treatment, whereby autoclaving of the silica-alumina is done either in vapour phase or in liquid phase, whereby this vapour phase or liquid phase of the autoclave may or may not be acid. This impregnation, prior to the autoclaving, may or may not be acid. This impregnation, prior to the autoclaving, can be carried out in the dry state or by immersion of the silica-alumina in an acidic aqueous solution. Dry impregnation is understood to mean placing the alumina in contact with a volume of solution less than or equal to the total pore volume of the treated alumina. The impregnation is preferably carried out in the dry state.

The autoclave is preferably a rotary-basket autoclave such as that defined in Patent Application EP-A-0 387 109.

The temperature during the autoclaving can be between 100 and 250° C. for a period of time between 30 minutes and 3 hours.

Hydrocracking Processes

The invention also concerns hydrocracking processes using hydrocracking catalysts according to the invention, said processes encompassing the ranges of pressure and conversion from mild hydrocracking to high pressure hydrocracking. Mild hydrocracking is understood to mean hydrocracking yielding moderate conversions, generally less than 50% and preferably less than 40%, and operating at low pressure, generally between 2 MPa and 6 MPa. In a general manner, the catalysts according to the invention are used for the treatment of hydrocarbon cuts. The catalysts according to the invention are advantageously used for hydrocracking and/or hydroconversion of hydrocarbon cuts.

The catalyst of the present invention can be used alone, in one or more catalytic fixed beds, in one or more reactors, in a so-called single-stage hydrocracking scheme, with or without liquid recycling of the unconverted fraction, optionally in combination with a hydrorefining catalyst situated upstream of the catalyst of the present invention.

The catalyst of the present invention can be used alone, in one or more catalytic ebullated beds, in one or more reactors, in a so-called single-stage hydrocracking scheme, with or without liquid recycling of the unconverted fraction, optionally in combination with a hydrorefining catalyst located in a fixed-bed or ebullated-bed reactor upstream of the catalyst of the present invention.

The ebullated bed operates with removal of the spent catalyst and daily addition of fresh catalyst in order to preserve the activity of the stable catalyst.

In a so-called two-stage hydrocracking scheme with intermediate separation between the two reaction zones, at a given stage, the catalyst of the present invention can be used in one or in both reactors in combination or otherwise with a hydrorefining catalyst situated upstream of the catalyst of the present invention.

So-Called Single Stage Process

So-called single stage hydrocracking includes in the first instance and in a general manner intensive hydrorefining which is designed to effect hydrodenitrogenation and intensive desulphurisation of the feed before the latter is sent to the hydrocracking catalyst proper, in particular in cases where the latter includes a zeolite. This intensive hydrorefining of the feed yields only a limited conversion of the feed, in lighter fractions, which remains insufficient and must therefore be supplemented on the more active hydrocracking catalyst. However, it will be noted that no separation takes place between the two types of catalysts. The entirety of the effluent leaving the reactor is injected onto the hydrocracking catalyst proper and it is only afterwards that a separation of the products formed is carried out. This version of hydrocracking, also referred to as "Once Through", has a variant which includes recycling of the unconverted fraction to the reactor for more complete conversion of the feed.

Embodiment: So-Called Single Stage Fixed Bed Process

For the catalysts with low silica content, the contents by weight of silica of the substrate included in the composition of the catalyst are between 5 and 30% and preferably between 5 and 20%.

For the catalysts with high silica content, the contents by weight of silica of the substrate included in the composition of the catalyst are between 20 and 80% and preferably between 30 and 60%.

In the case where the catalyst according to the present invention is used upstream of a zeolitic hydrocracking catalyst, for example based on Y zeolite, a catalyst having a low content by weight of silica such as previously defined will advantageously be used. It can also advantageously be used in combination with a hydrorefining catalyst, the latter being situated upstream of the catalyst of the present invention.

When the catalyst according to the present invention is used upstream of a silica-alumina-based or zeolite-based hydrocracking catalyst, in the same reactor in separate catalytic beds or in separate reactors, the conversion is generally (or preferably) less than 50% by weight and preferably less than 40%.

Embodiment: So-Called Single Stage Ebullated Bed Process

The catalyst according to the invention can be used alone in one or more reactors.

In such a process, use may advantageously be made of several reactors in series, the ebullated-bed reactor(s) containing the catalyst according to the invention being preceded by one or more reactors containing at least one hydrorefining catalyst in fixed bed or ebullated bed.

When the catalyst according to the present invention is used downstream of a hydrorefining catalyst, the conversion of the fraction of the feed brought about by this hydrorefining catalyst is generally (or preferably) less than 30% by weight and preferably less than 25%.

Embodiment: So-Called Single Stage Fixed Bed Process with Hot Flash

The catalyst according to the present invention can also be used in a so-called single-stage hydrocracking process including a hydrorefining zone, a zone enabling the partial removal of ammonia, for example by a hot flash, and a zone including a hydrocracking catalyst. This single-stage hydrocracking process for hydrocarbon feedstocks for the production of middle distillates and optionally of base oils includes at least one first reaction zone including hydrorefining, and at least one second reaction zone, in which hydrocracking of at least part of the effluent from the first reaction zone takes place. This process also includes incomplete separation of the ammonia from the effluent leaving the first zone. This separation is advantageously accomplished by means of an intermediate hot flash. The hydrocracking performed in the second reaction zone is carried out in the presence of ammonia in an amount less than the amount present in the feed, preferably less than 1500 ppm by weight, more preferably less than 1000 ppm by weight, and even more preferably less than 800 ppm by weight of nitrogen. The catalyst of the present invention is preferably used in the hydrocracking reaction zone in combination or otherwise with a hydrorefining catalyst situated upstream of the catalyst of the present invention.

The catalyst according to the invention can be used either in the first reaction zone as a conversion pre-treatment, alone or in association with a conventional hydrorefining catalyst, situated upstream of the catalyst according to the invention, in one or more catalytic beds, in one or more reactors.

A process representing a variant of the embodiments of the invention cited above includes:
- a first hydrorefining reaction zone in which the feed is contacted with at least one hydrorefining catalyst presenting in the standard activity test a cyclohexane conversion rate less than 10% by mass,
- a second hydrocracking reaction zone in which at least a part of the effluent from the hydrorefining stage is contacted with at least one zeolitic hydrocracking catalyst presenting in the standard activity test a cyclohexane conversion rate more than 10% by mass, the catalyst according to the invention being present in at least one of the two reaction zones.

The purpose of the standard activity test is to measure the activity of the catalysts in terms of the conversion of cyclohexane. The cyclohexane conversion takes into account all of the different products of cyclohexane. The presence of a more or less strong acid function on the catalyst is required in order to obtain all of these products.

When it is present in the first reaction zone, the catalyst according to the invention can be used alone or in combination with another hydrorefining catalyst.

When it is present in the second reaction zone, the catalyst according to the invention can be used alone or in combination with another hydrocracking catalyst.

So-Called Two Stage Process

Two-stage hydrocracking includes a first stage of which the purpose, as in the "single stage" process, is to effect hydrorefining (or hydrotreating) of the feed, but also to attain a conversion of the latter generally in the order of 40 to 60%. The effluent arising from the first stage is then subjected to a separation (distillation) most commonly referred to as intermediate separation, the purpose of which is to separate the conversion products of the unconverted fraction. In the second stage of a two-stage hydrocracking process, only the fraction of the feed not converted in the first stage is treated. This separation enables a two-stage hydrocracking process to be more selective on middle distillates (kerosene+diesel) than a single-stage process. In effect, intermediate separation of the conversion products avoids the "over-cracking" thereof into naphtha and gas in the second stage on the hydrocracking catalyst. Furthermore, it will be noted that the unconverted fraction of the feed treated in the second stage generally contains very low levels of $NH_3$ and organic nitrogen compounds, generally less than 20 ppm by weight or less than 10 ppm by weight.

The same configuration of catalytic beds in a fixed bed or ebullated bed arrangement can be used in the first stage of a so-called two-stage scheme, whether the catalyst is used alone or in combination with a conventional hydrorefining catalyst.

For so-called single-stage processes and for the first stage of two-stage hydrocracking processes, the preferred catalysts according to the invention are catalysts based on non-noble group VIII elements, and even more preferably catalysts based on nickel and tungsten or molybdenum, which can be doped with an element selected from the group formed by boron, phosphorus and silicon, preferably phosphorus.

The catalysts used in the second reaction zone of single-stage hydrocracking processes or in the second stage of two-stage hydrocracking processes are preferably catalysts based on noble elements of group VIII, and even more preferably catalysts based on platinum and/or palladium.

Feedstocks

A wide variety of feedstocks can be treated by the hydrocracking processes according to the invention described above and they generally contain at least 20% by volume and often at least 80% by volume of compounds boiling above 340° C.

For example the feedstock can be LCO (light cycle oil), atmospheric distillates, vacuum distillates for example gas oils from direct distillation of crude or conversion units such as FCC, coker or visbreaking, and also feedstocks obtained from aromatic extraction units from base lubricating oils or derived from solvent dewaxing of base lubricating oils, or distillates derived from processes of desulphurisation or fixed-bed or ebullated-bed hydroconversion of atmospheric residues and/or vacuum residues and/or deasphalted oils, or else the feedstock can be a deasphalted oil, or any mixture of the feedstocks previously cited. The above list is not limitative. Paraffins derived from the Fischer-Tropsch process are excluded. In general, the feedstocks have a boiling point T5 over 340° C., and preferably over 370° C., that is to say 95% of the compounds present in the feed have a boiling point over 340° C., and preferably over 370° C.

The nitrogen content of the feedstocks treated in the processes according to the invention is usually more than 500 ppm, preferably between 500 and 5000 ppm by weight, more preferably between 700 and 4000 ppm by weight, and even more preferably between 1000 and 4000 ppm, and the sulphur content is between 0.01 and 5% by weight, more generally between 0.2 and 4%.

The metals content is generally less than 2 ppm and preferably less than 1 ppm $Ni^+ V$ maximum. The content of C7 asphaltenes is generally less than 5000 ppm, preferably less than 1000 ppm, and more preferably less than 200 ppm.

Before injection of the feed, the catalysts used in the process according to the present invention preferably undergo a preliminary sulphurisation treatment to transform, at least partially, the metallic species into sulphide before they are contacted with the feedstock to be treated. This activation treatment by sulphurisation is well known to the person skilled in the art and can be accomplished by any method already described in the literature either in-situ, that is in the reactor, or ex-situ.

A conventional sulphurisation method well known to the person skilled in the art consists in heating in the presence of hydrogen sulphide (pure or for example in a stream of a hydrogen/hydrogen sulphide mixture) at a temperature between 150 and 800° C., preferably between 250 and 600° C., generally in a traversed-bed reaction zone.

The operating conditions of hydrocracking such as temperature, pressure, hydrogen recycling rate, hourly space velocity, can be highly variable in relation to the nature of the feedstock, the quality of the desired products, and the facilities available to the refiner. The hydrocracking catalyst is contacted, in the presence of hydrogen, with the feedstocks previously described, at a temperature over 200° C., often between 250 and 480° C., advantageously between 320 and 450° C., preferably between 330 and 435° C., at a pressure over 1 MPa, often between 2 and 25 MPa, preferably between 3 and 20 MPa, the space velocity being comprised between 0.1 and 20 $h^{-1}$ and preferably 0.1-6 $h^{-1}$, preferably, 0.2-3 $h^{-1}$, and the quantity of hydrogen introduced is such that the volume ratio liter of hydrogen/liter of hydrocarbon is between 80 and 5000 l/l and most often between 100 and 2000 l/l.

These operating conditions used in the process according to the invention make it possible to attain conversions per pass, of products with boiling points below 340° C., and preferably below 370° C., of more than 15% and even more preferably between 20 and 95%.

The following examples illustrate the present invention without however limiting its scope.

EXAMPLE 1

Preparation and Shaping of a Silica-Alumina Matrix MA1

A matrix precursor MA1 is prepared as follows: in the first instance a 30% sulphuric acid solution is added to a sodium silicate solution. The quantity of $H_2SO_4$ is defined so as to work at a fixed neutralisation rate. The addition is made in two minutes while stirring at 600 revolutions/minute. The synthesis temperature is 60° C. The curing time was set at 30 minutes. Stirring is maintained at 600 revolutions/minute, and the temperature is that of the previous step. $Al_2(SO_4)_3$ (500 ml) is then added, the concentration is determined by the desired alumina content. The pH is not regulated and is determined by the desired alumina content. The addition is made in 10 minutes. Stirring remains set at 600 revolutions/minute, the temperature is the same as that in the preceding steps. Ammonia is then added. The gel obtained is filtered by displacement. Washing is carried out with water at 60° C., 3 kg of water per kg of solid contained in the gel. An exchange with ammonium nitrate $NH_4NO_3$ (138.5 g/l) at 60° C. and 1.5 l per kg of solid contained in the gel is then carried out. Finally, an additional washing with water at 60° C. is carried out by displacement, 3 kg of water per kg of solid contained in the gel. The gel obtained in this step is mixed with Pural boehmite powder in a manner such that the final composition of anhydrous product, at this stage of the synthesis, is equal to 50% $Al_2O_3$-50% $SiO_2$.

Mixing is carried out in a Z-arm mixer. Extrusion is performed by passing the paste through a die with 1.4 mm diameter holes. The extrudates thus obtained are dried at 150° C., calcined at 550° C., then calcined at 700° C. in the presence of water vapour.

The characteristics of the matrix are as follows:

The composition of the matrix MA1 is 50.12% $Al_2O_3$-49.88% $SiO_2$.

The BET surface area of the matrix is 254 $m^2/g$.

The total pore volume, measured by nitrogen adsorption, is 0.43 ml/g.

The mean pore diameter, measured by mercury porosimetry, is 65 Å.

The ratio between the volume V2, measured by mercury porosimetry, comprised between $D_{mean}$−30 Å and $D_{mean}$+30 Å, to the total mercury volume is 0.91.

The volume V3, measured by mercury porosimetry, contained in the pores with diameters greater than $D_{mean}$+30 Å, is 0.03 ml/g.

The volume V6, measured by mercury porosimetry, contained in the pores with diameters greater than $D_{mean}$+15 Å, is 0.047 ml/g.

The ratio between the adsorption surface and the BET surface area is 0.76.

The pore volume, measured by mercury porosimetry, contained in the pores with diameters greater than 140 Å, is 0.015 ml/g.

The pore volume, measured by mercury porosimetry, contained in the pores with diameters greater than 160 Å, is 0.013 ml/g.

The pore volume, measured by mercury porosimetry, contained in the pores with diameters greater than 200 Å, is 0.011 ml/g.

The pore volume, measured by mercury porosimetry, contained in the pores with diameters greater than 500 Å, is 0.001 ml/g.

The X-ray diffraction diagram contains the main lines characteristic of gamma alumina and in particular it contains the peaks with a "d" value between 1.39 to 1.40 Å and with a "d" value between 1.97 Å to 2.00 Å.

The content of atomic sodium is 310+/−20 ppm. The content of atomic sulphur is 1500 ppm. The NMR MAS spectra of the $^{27}$Al solid of the matrix show two distinct clusters of peaks. A first type of aluminium whose maximum resonates around 10 ppm extends between −100 and 20 ppm. The position of the maximum suggests that these species are essentially of the type $Al_{VI}$ (octahedral). A second type of minority aluminium whose maximum resonates around 60 ppm extends between 20 and 100 ppm. This cluster can be broken down into at least two species. The predominant species in this cluster corresponds to atoms of $Al_{IV}$ (tetrahedral). The proportion of octahedral $Al_{VI}$ is 67%.

The matrix contains two silica-alumina zones, said zones having Si/Al ratios less than or greater than the overall Si/Al ratio determined by X-ray fluorescence. One of the zones has an Si/Al ratio determined by TEM of 0.7 and the other zone has an Si/Al ratio determined by TEM of 0.98.

The B/L ratio of the matrix is equal to 0.12.

EXAMPLE 2

Preparation and Shaping of a Silica-Alumina Matrix MA2

An alumina hydrate is prepared according to the teaching of U.S. Pat. No. 3,124,418. After filtration, the freshly prepared precipitate is mixed with a silicic acid solution prepared by exchange on a decationising resin. The proportions of the two solutions are adjusted so as to achieve a composition of 70% $Al_2O_3$-30% $SiO_2$ on the final substrate. This mixture is rapidly homogenised in a commercial colloidal mill in the presence of nitric acid in a manner such that the nitric acid content of the suspension leaving the mill is 8% referred to the mixed silica-alumina solid. The suspension is then dried conventionally in a spray dryer in the conventional manner between 300° C. and 60° C. The powder thus prepared is mixed in a Z-arm mixer in the presence of 8% nitric acid in relation to the anhydrous product. Extrusion is performed by passing the paste through a die with 1.4 mm diameter holes. The extrudates thus obtained are dried at 150° C., calcined at 550° C., then calcined at 750° C. in the presence of water vapour.

The characteristics of the matrix MA2 are as follows:

The silica-alumina composition is 69.5% $Al_2O_3$ and 30.5% $SiO_2$.

The BET surface area is 250 m$^2$/g.

The total pore volume, measured by nitrogen adsorption, is 0.45 ml/g.

The mean pore diameter, measured by mercury porosimetry, is 70 Å.

The ratio between the volume V2, measured by mercury porosimetry, comprised between $D_{mean}$−30 Å and $D_{mean}$+30 Å, to the total mercury volume is 0.9.

The volume V3, measured by mercury porosimetry, contained in the pores with diameters greater than $D_{mean}$+30 Å, is 0.021 ml/g.

The volume V6, measured by mercury porosimetry, contained in the pores with diameters greater than $D_{mean}$+15 Å, is 0.035 ml/g.

The ratio between the adsorption surface and the BET surface area is 0.82.

The pore volume, measured by mercury porosimetry, contained in the pores with diameters greater than 140 Å, is 0.015 ml/g.

The pore volume, measured by mercury porosimetry, contained in the pores with diameters greater than 160 Å, is 0.01 ml/g.

The pore volume, measured by mercury porosimetry, contained in the pores with diameters greater than 200 Å, is 0.007 ml/g.

The pore volume, measured by mercury porosimetry, contained in the pores with diameters greater than 500 Å, is 0.001 ml/g.

The X-ray diffraction diagram contains the main lines characteristic of gamma alumina and in particular it contains the peaks with a "d" value between 1.39 to 1.40 Å and with a "d" value between 1.97 Å to 2.00 Å.

The content of atomic sodium is 250+/−20 ppm. The content of atomic sulphur is 2000 ppm.

The NMR MAS spectra of the $^{27}$Al solid of the matrix show two distinct clusters of peaks. A first type of aluminium whose maximum resonates around 10 ppm extends between −100 and 20 ppm. The position of the maximum suggests that these species are essentially of the type $Al_{VI}$ (octahedral). A second type of minority aluminium whose maximum resonates around 60 ppm extends between 20 and 100 ppm. This cluster can be broken down into at least two species. The predominant species in this cluster corresponds to atoms of $Al_{IV}$ (tetrahedral). The proportion of octahedral $Al_{VI}$ is 69%.

The matrix contains a single silica-alumina zone with an Si/Al ratio determined by TEM microprobe of 0.37.

The B/L ratio of the matrix is equal to 0.11.

EXAMPLE 3

Preparation and Shaping of a Silica-Alumina Matrix MA3

The aluminium hydroxide powder was prepared according to the process described in the Patent WO 00/01617. The mean particle size of the aluminium hydroxide particles measured by laser granulometry is 40 microns. This powder is mixed with a silica sol prepared by exchange on a decationising resin, then filtered on a resin of porosity 2. The concentrations of silica sol and aluminium hydroxide powder are adjusted so as to obtain a final composition of 60% $Al_2O_3$ and 40% $SiO_2$. Shaping is performed in the presence of 15% nitric acid in relation to the anhydrous product. Mixing is carried out in a Z-arm mixer. Extrusion is performed by passing the paste through a die with 1.4 mm diameter holes. The extrudates thus obtained are dried at 150° C., calcined at 550° C., then calcined at 750° C. in the presence of water vapour.

The characteristics of the matrix are as follows:

The silica-alumina composition of the matrix is 59.7% $Al_2O_3$ and 40.3% $SiO_2$.

The BET surface area is 248 m$^2$/g.

The total pore volume, measured by nitrogen adsorption, is 0.46 ml/g.

The mean pore diameter, measured by mercury porosimetry, is 69 Å.

The ratio between the volume V2, measured by mercury porosimetry, comprised between $D_{mean}-30$ Å and $D_{mean}+30$ Å, to the total mercury volume is 0.9.

The volume V3, measured by mercury porosimetry, contained in the pores with diameters greater than $D_{mean}+30$ Å, is 0.022 ml/g.

The volume V6, measured by mercury porosimetry, contained in the pores with diameters greater than $D_{mean}+15$ Å, is 0.031 ml/g.

The ratio between the adsorption surface and the BET surface area is 0.83.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.0105 ml/g.

The pore volume, measured by mercury porosimetry, contained in the pores with diameters greater than 200 Å, is 0.0065 ml/g.

The pore volume, measured by mercury porosimetry, contained in the pores with diameters greater than 500 Å, is 0.001 ml/g.

The X-ray diffraction diagram contains the main lines characteristic of gamma alumina and in particular it contains the peaks with a "d" value between 1.39 to 1.40 Å and with a "d" value between 1.97 Å to 2.00 Å.

The content of atomic sodium is 200+/−20 ppm. The content of atomic sulphur is 800 ppm.

The NMR MAS spectra of the $^{27}$Al solid of the matrix show two distinct clusters of peaks. A first type of aluminium whose maximum resonates around 10 ppm extends between −100 and 20 ppm. The position of the maximum suggests that these species are essentially of the type $Al_{VI}$ (octahedral). A second type of minority aluminium whose maximum resonates around 60 ppm extends between 20 and 100 ppm. This cluster can be broken down into at least two species. The predominant species in this cluster corresponds to atoms of $Al_{IV}$ (tetrahedral). The proportion of octahedral $Al_{VI}$ is 70%.

The matrix contains two silica-alumina zones, said zones having Si/Al ratios less than or greater than the overall Si/Al ratio determined by X-ray fluorescence. One of the zones has an Si/Al ratio determined by TEM of 0.22 and the other zone has an Si/Al ratio determined by TEM of 0.85.

The B/L ratio of the matrix is equal to 0.12.

EXAMPLE 4

Preparation and Shaping of a Silica-Alumina Matrix (MA4)

The matrix MA4 is obtained as follows.

The silica-alumina gels are prepared by mixing silicate of soda and water, and passing this mixture over an ion exchange resin. A solution of aluminium chloride hexahydrate in water is added to the decationised silica sol. To obtain a gel, ammonia is added, the precipitate is then filtered, and washing is carried out with a solution of water and concentrated ammonia until the conductivity of the washing water is constant. The gel obtained in this step is mixed with Pural boehmite powder in a manner such that the final composition of anhydrous product in the mixed substrate, at this stage of the synthesis, is equal to 60% $Al_2O_3$-40% $SiO_2$. This suspension is processed in a colloidal mill in the presence of nitric acid. The content of added nitric acid is adjusted so that the percentage of nitric acid in the product leaving the mill is 8% referred to the mass of solid mixed oxide. This mixture is then filtered to reduce the amount of water in the mixed slurry. The slurry is then mixed in the presence of 10% nitric acid then extruded. Mixing is carried out in a Z-arm mixer. Extrusion is performed by passing the paste through a die with 1.4 mm diameter holes. The extrudates thus obtained are dried at 150° C., calcined at 550° C., then calcined at 700° C. in the presence of water vapour.

The characteristics of the matrix MA4 are as follows:

The silica-alumina composition of the matrix is 60.7% $Al_2O_3$ and 39.3% $SiO_2$.

The BET surface area is 258 m$^2$/g.

The total pore volume, measured by nitrogen adsorption, is 0.47 ml/g.

The mean pore diameter, measured by mercury porosimetry, is 69 Å.

The ratio between the volume V2, measured by mercury porosimetry, comprised between $D_{mean}-30$ Å and $D_{mean}+30$ Å, to the total mercury volume is 0.89.

The volume V3, measured by mercury porosimetry, contained in the pores with diameters greater than $D_{mean}+30$ Å, is 0.032 ml/g.

The volume V6, measured by mercury porosimetry, contained in the pores with diameters greater than $D_{mean}+15$ Å, is 0.041 ml/g.

The ratio between the adsorption surface and the BET surface area is 0.83.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.0082 ml/g.

The pore volume, measured by mercury porosimetry, contained in the pores with diameters greater than 200 Å, is 0.0063 ml/g.

The pore volume, measured by mercury porosimetry, contained in the pores with diameters greater than 500 Å, is 0.001 ml/g.

The X-ray diffraction diagram contains the main lines characteristic of gamma alumina and in particular it contains the peaks with a "d" value between 1.39 to 1.40 Å and with a "d" value between 1.97 Å to 2.00 Å.

The content of atomic sodium is 200+/−20 ppm. The content of atomic sulphur is 800 ppm.

The NMR MAS spectra of the $^{27}$Al solid of the matrix show two distinct clusters of peaks. A first type of aluminium whose maximum resonates around 10 ppm extends between −100 and 20 ppm. The position of the maximum suggests that these species are essentially of the type $Al_{VI}$ (octahedral). A second type of minority aluminium whose maximum resonates around 60 ppm extends between 20 and 100 ppm. This cluster can be broken down into at least two species. The predominant species in this cluster corresponds to atoms of $Al_{IV}$ (tetrahedral). The proportion of octahedral $Al_{VI}$ is 70%.

The matrix contains a single silica-alumina zone with an Si/Al ratio determined by TEM microprobe of 0.63.

The B/L ratio of the matrix is equal to 0.11.

EXAMPLE 5

Preparation of Hydrocracking Catalyst Substrates According to the Invention (SU5 to SU8)

A zeolite Z1 is used with an Si/Al ratio measured by XRF of 14.7, an Si/Al structure ratio measured by NMR of 19, a sodium content of 260 ppm, a mesh parameter a=24.29 Å, a crystallinity rate of 88%, and a BET surface area equal to 838 m²/g.

Then 5 g of the zeolite Z1 described above and 95 g of matrix precursors MA1 to MA4 referred to solid matter such as those described above are mixed. This mixing is carried out before introduction into the extruder. The zeolite powder is pre-wetted and added to the matrix suspension in the presence of 66% nitric acid (7% by weight of acid per gram of dry gel) then mixed for 15 minutes. On completion of this mixing, the paste obtained is passed through a die with cylindrical holes of diameter equal to 1.4 mm. The extrudates are then dried overnight at 120° C. in air then calcined at 550° C. in air, then calcined at 700° C. in the presence of water vapour.

The substrates SU5 to SU8 containing 5% of zeolite Z1 referred to anhydrous mass are thus obtained.

The characteristics of the substrates according to the invention are:

For the substrate SU5, the composition of the substrate matrix is 50.1% $Al_2O_3$-49.9% $SiO_2$.

The BET surface area of the substrate is 280 m²/g.

The total pore volume, measured by nitrogen adsorption, is 0.418 ml/g.

The mean pore diameter, measured by mercury porosimetry, is 64 Å.

The ratio between the volume V2, measured by mercury porosimetry, comprised between $D_{mean}$–30 Å and $D_{mean}$+30 Å, to the total mercury volume is 0.91.

The volume V3, measured by mercury porosimetry, contained in the pores with diameters greater than $D_{mean}$+30 Å, is 0.03 ml/g.

The volume V6, measured by mercury porosimetry, contained in the pores with diameters greater than $D_{mean}$+15 Å, is 0.047 ml/g.

The ratio between the adsorption surface and the BET surface area is 0.76.

The pore volume, measured by mercury porosimetry, contained in the pores with diameters greater than 140 Å, is 0.014 ml/g.

The pore volume, measured by mercury porosimetry, contained in the pores with diameters greater than 160 Å, is 0.012 ml/g.

The pore volume, measured by mercury porosimetry, contained in the pores with diameters greater than 200 Å, is 0.010 ml/g.

The pore volume, measured by mercury porosimetry, contained in the pores with diameters greater than 500 Å, is 0.001 ml/g.

The packing density of the substrate is 0.795 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the lines characteristic of the zeolite Z1 introduced.

The atomic sodium content is 290+/−20 ppm. The atomic sulphur content is 1500 ppm.

For the substrate SU6, the characteristics of the substrates are as follows:

The silica-alumina composition of the substrate matrix is 69.5% $Al_2O_3$ and 30.5% $SiO_2$.

The BET surface area is 279 m²/g.

The total pore volume, measured by nitrogen adsorption, is 0.437 ml/g.

The mean pore diameter, measured by mercury porosimetry, is 69 Å.

The ratio between the volume V2, measured by mercury porosimetry, comprised between $D_{mean}$–30 Å and $D_{mean}$+30 Å, to the total mercury volume is 0.9.

The volume V3, measured by mercury porosimetry, contained in the pores with diameters greater than $D_{mean}$+30 Å, is 0.020 ml/g.

The volume V6, measured by mercury porosimetry, contained in the pores with diameters greater than $D_{mean}$+15 Å, is 0.034 ml/g.

The pore volume, measured by mercury porosimetry, contained in the pores with diameters greater than 140 Å, is 0.015 ml/g.

The pore volume, measured by mercury porosimetry, contained in the pores with diameters greater than 160 Å, is 0.01 ml/g.

The pore volume, measured by mercury porosimetry, contained in the pores with diameters greater than 200 Å, is 0.068 ml/g.

The pore volume, measured by mercury porosimetry, contained in the pores with diameters greater than 500 Å, is 0.001 ml/g.

The packing density of the substrate is 0.797 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å.
the lines characteristic of the zeolite Z2.

The content of atomic sodium is 240+/−20 ppm. The content of atomic sulphur is 1900 ppm.

The characteristics of the substrate SU7 are as follows:

The silica-alumina composition of the matrix is 59.7% $Al_2O_3$ and 40.3% $SiO_2$.

The BET surface area is 283 m²/g.

The total pore volume, measured by nitrogen adsorption, is 0.45 ml/g.

The mean pore diameter, measured by mercury porosimetry, is 68 Å.

The ratio between the volume V2, measured by mercury porosimetry, comprised between $D_{mean}$–30 Å and $D_{mean}$+30 Å, to the total mercury volume is 0.9.

The volume V3, measured by mercury porosimetry, contained in the pores with diameters greater than $D_{mean}$+30 Å, is 0.021 ml/g.

The volume V6, measured by mercury porosimetry, contained in the pores with diameters greater than $D_{mean}$+15 Å, is 0.030 ml/g.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.010 ml/g.

The pore volume, measured by mercury porosimetry, contained in the pores with diameters greater than 200 Å, is 0.063 ml/g.

The pore volume, measured by mercury porosimetry, contained in the pores with diameters greater than 500 Å, is 0.001 ml/g.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite Z1.

The content of atomic sodium is 190+/−20 ppm. The content of atomic sulphur is 800 ppm.

The packing density of the substrate is 0.79 g/cm³.

The characteristics of the substrate SU8 are as follows:

The silica-alumina composition of the substrate matrix is 60.7% $Al_2O_3$ and 39.3% $SiO_2$.

The BET surface area is 287 m²/g.

The total pore volume, measured by nitrogen adsorption, is 0.46 ml/g.

The mean pore diameter, measured by mercury porosimetry, is 68 Å.

The ratio between the volume V2, measured by mercury porosimetry, comprised between $D_{mean}$−30 Å and $D_{mean}$+30 Å, to the total mercury volume is 0.89.

The volume V3, measured by mercury porosimetry, contained in the pores with diameters greater than $D_{mean}$+30 Å, is 0.031 ml/g.

The volume V6, measured by mercury porosimetry, contained in the pores with diameters greater than $D_{mean}$+15 Å, is 0.040 ml/g.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.008 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.795 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite Z1.

The content of atomic sodium is 200+/−20 ppm. The content of atomic sulphur is 800 ppm.

EXAMPLE 6

Preparation of Hydrocracking Catalyst Substrates According to the Invention (SU9 to SU12)

A zeolite Z2 is used with an Si/Al ratio measured by XRF of 73, a sodium content of 102 ppm, a mesh parameter a=24.15 Å, a crystallinity rate of 44%, and a BET surface area equal to 783 m²/g.

Then 5 g of the zeolite Z2 described above and 10 g of the matrix precursors MA1 to MA4 described above are mixed. This mixing is carried out before introduction into the extruder. The zeolite powder is pre-wetted and added to the matrix suspension in the presence of 66% nitric acid (7% by weight of acid per gram of dry gel) then mixed for 15 minutes. On completion of this mixing, the paste obtained is passed through a die with cylindrical holes of diameter equal to 1.4 mm. The extrudates are then dried overnight at 120° C. in air then calcined at 550° C. in air, then calcined at 700° C. in the presence of water vapour. The substrates SU9 to SU12 are thus obtained.

The characteristics of the substrates according to the invention are:

For the substrate SU9, the composition of the substrate matrix is 50.1% $Al_2O_3$-49.9% $SiO_2$.

The BET surface area of the substrate is 283 m²/g.

The total pore volume, measured by nitrogen adsorption, is 0.418 ml/g.

The mean pore diameter, measured by mercury porosimetry, is 64 Å.

The ratio between the volume V2, measured by mercury porosimetry, comprised between $D_{mean}$−30 Å and $D_{mean}$+30 Å, to the total mercury volume is 0.91.

The volume V3, measured by mercury porosimetry, contained in the pores with diameters greater than $D_{mean}$+30 Å, is 0.03 ml/g.

The volume V6, measured by mercury porosimetry, contained in the pores with diameters greater than $D_{mean}$+15 Å, is 0.047 ml/g.

The pore volume, measured by mercury porosimetry, contained in the pores with diameters greater than 140 Å, is 0.014 ml/g.

The pore volume, measured by mercury porosimetry, contained in the pores with diameters greater than 160 Å, is 0.012 ml/g.

The pore volume, measured by mercury porosimetry, contained in the pores with diameters greater than 200 Å, is 0.010 ml/g.

The pore volume, measured by mercury porosimetry, contained in the pores with diameters greater than 500 Å, is 0.001 ml/g.

The packing density of the substrate is 0.795 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the lines characteristic of the zeolite Z2 introduced.

The content of atomic sodium is 290+/−20 ppm. The content of atomic sulphur is 1500 ppm.

For the substrate SU10, the characteristics of the substrates are as follows:

The silica-alumina composition of the substrate matrix is 69.5% $Al_2O_3$ and 30.5% $SiO_2$.

The BET surface area is 279 m²/g.

The total pore volume, measured by nitrogen adsorption, is 0.438 ml/g.

The mean pore diameter, measured by mercury porosimetry, is 69 Å.

The ratio between the volume V2, measured by mercury porosimetry, comprised between $D_{mean}$−30 Å and $D_{mean}$+30 Å, to the total mercury volume is 0.9.

The volume V3, measured by mercury porosimetry, contained in the pores with diameters greater than $D_{mean}$+30 Å, is 0.020 ml/g.

The volume V6, measured by mercury porosimetry, contained in the pores with diameters greater than $D_{mean}$+15 Å, is 0.034 ml/g.

The pore volume, measured by mercury porosimetry, contained in the pores with diameters greater than 140 Å, is 0.015 ml/g.

The pore volume, measured by mercury porosimetry, contained in the pores with diameters greater than 160 Å, is 0.013 ml/g.

The pore volume, measured by mercury porosimetry, contained in the pores with diameters greater than 200 Å, is 0.0068 ml/g.

The pore volume, measured by mercury porosimetry, contained in the pores with diameters greater than 500 Å, is 0.001 ml/g.

The packing density of the substrate is 0.79 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å.
the lines characteristic of the zeolite Z2.

The content of atomic sodium is 240+/−20 ppm. The content of atomic sulphur is 1900 ppm.

The characteristics of the substrate SU11 are as follows:
The silica-alumina composition of the matrix is 59.7% $Al_2O_3$ and 40.3% $SiO_2$.

The BET surface area is 275 $m^2/g$.

The total pore volume, measured by nitrogen adsorption, is 0.45 ml/g.

The mean pore diameter, measured by mercury porosimetry, is 68 Å.

The ratio between the volume V2, measured by mercury porosimetry, comprised between $D_{mean}$−30 Å and $D_{mean}$+30 Å, to the total mercury volume is 0.9.

The volume V3, measured by mercury porosimetry, contained in the pores with diameters greater than $D_{mean}$+30 Å, is 0.021 ml/g.

The volume V6, measured by mercury porosimetry, contained in the pores with diameters greater than $D_{mean}$+15 Å, is 0.030 ml/g.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.010 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.795 $g/cm^3$.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite Z2.

The content of atomic sodium is 190+/−20 ppm. The content of atomic sulphur is 800 ppm.

The characteristics of the substrate SU12 are as follows:
The silica-alumina composition of the substrate matrix is 60.7% $Al_2O_3$ and 39.3% $SiO_2$.

The BET surface area is 284 $m^2/g$.

The total pore volume, measured by nitrogen adsorption, is 0.46 ml/g.

The mean pore diameter, measured by mercury porosimetry, is 68 Å.

The ratio between the volume V2, measured by mercury porosimetry, comprised between $D_{mean}$−30 Å and $D_{mean}$+30 Å, to the total mercury volume is 0.89.

The volume V3, measured by mercury porosimetry, contained in the pores with diameters greater than $D_{mean}$+30 Å, is 0.031 ml/g.

The volume V6, measured by mercury porosimetry, contained in the pores with diameters greater than $D_{mean}$+15 Å, is 0.040 ml/g.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.008 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.79 $g/cm^3$.

The X-ray diffraction diagram contains:
the main lines characteristic of gamma alumina and in particular it contains the peaks with a d value between 1.39 to 1.40 Å and with a d value between 1.97 Å to 2.00 Å,
the main lines characteristic of the zeolite Z2.

The content of atomic sodium is 200+/−20 ppm. The content of atomic sulphur is 800 ppm.

EXAMPLE 7

Preparation of Hydrocracking Catalyst Substrates According to the Invention (SU13 to SU16)

A zeolite Z3 as described in U.S. Pat. No. 5,601,798 is used. This zeolite is prepared according to the method described in example 52 in Table 16. The mesopore volume obtained is 0.36 $cm^3/g$. The mesh parameter a is 24.34 Å and the crystallinity rate is 75%. Then 5 g of the zeolite Z3 described above and 95 g of matrix precursors MA1 to MA4 referred to solid matter such as those described above are mixed. This mixing is carried out before introduction into the extruder. The zeolite powder is pre-wetted and added to the matrix suspension in the presence of 66% nitric acid (7% by weight of acid per gram of dry gel) then mixed for 15 minutes. On completion of this mixing, the paste obtained is passed through a die with cylindrical holes of diameter equal to 1.4 mm. The extrudates are then dried overnight at 120° C. in air then calcined at 550° C. in air, then calcined at 700° C. in the presence of water vapour.

The substrates SU13 to SU16 are thus obtained.

The characteristics of the substrates according to the invention are:

For the substrate SU13, the composition of the substrate matrix is 50.1% $Al_2O_3$-49.9% $SiO_2$.

The BET surface area of the substrate is 280 $m^2/g$.

The total pore volume, measured by nitrogen adsorption, is 0.425 ml/g.

The mean pore diameter, measured by mercury porosimetry, is 64 Å.

The ratio between the volume V2, measured by mercury porosimetry, comprised between $D_{mean}$−30 Å and $D_{mean}$+30 Å, to the total mercury volume is 0.91.

The volume V3, measured by mercury porosimetry, contained in the pores with diameters greater than $D_{mean}$+30 Å, is 0.03 ml/g.

The volume V6, measured by mercury porosimetry, contained in the pores with diameters greater than $D_{mean}$+15 Å, is 0.047 ml/g.

The pore volume, measured by mercury porosimetry, contained in the pores with diameters greater than 140 Å, is 0.015 ml/g.

The pore volume, measured by mercury porosimetry, contained in the pores with diameters greater than 160 Å, is 0.013 ml/g.

The pore volume, measured by mercury porosimetry, contained in the pores with diameters greater than 200 Å, is 0.011 ml/g.

The pore volume, measured by mercury porosimetry, contained in the pores with diameters greater than 500 Å, is 0.001 ml/g.

The packing density of the substrate is 0.79 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite Z3.

The content of atomic sodium is 290+/−20 ppm. The content of atomic sulphur is 1500 ppm.

For the substrate SU14, the characteristics of the substrates are as follows:

The silica-alumina composition of the substrate matrix is 69.5% $Al_2O_3$ and 30.5% $SiO_2$.

The BET surface area is 276 m²/g.

The total pore volume, measured by nitrogen adsorption, is 0.438 ml/g.

The mean pore diameter, measured by mercury porosimetry, is 69 Å.

The ratio between the volume V2, measured by mercury porosimetry, comprised between $D_{mean}-30$ Å and $D_{mean}+30$ Å, to the total mercury volume is 0.9.

The volume V3, measured by mercury porosimetry, contained in the pores with diameters greater than $D_{mean}+30$ Å, is 0.020 ml/g.

The volume V6, measured by mercury porosimetry, contained in the pores with diameters greater than $D_{mean}+15$ Å, is 0.034 ml/g.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.010 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.79 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å.
the lines characteristic of the zeolite Z3.

The content of atomic sodium is 240+/−20 ppm. The content of atomic sulphur is 1900 ppm.

The characteristics of the substrate SU15 are as follows:

The silica-alumina composition of the matrix is 59.7% $Al_2O_3$ and 40.3% $SiO_2$.

The BET surface area is 275 m²/g.

The total pore volume, measured by nitrogen adsorption, is 0.455 ml/g.

The mean pore diameter, measured by mercury porosimetry, is 68 Å.

The ratio between the volume V2, measured by mercury porosimetry, comprised between $D_{mean}-30$ Å and $D_{mean}+30$ Å, to the total mercury volume is 0.9.

The volume V3, measured by mercury porosimetry, contained in the pores with diameters greater than $D_{mean}+30$ Å, is 0.021 ml/g.

The volume V6, measured by mercury porosimetry, contained in the pores with diameters greater than $D_{mean}+15$ Å, is 0.030 ml/g.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.010 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.795 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite Z3.

The content of atomic sodium is 190+/−20 ppm. The content of atomic sulphur is 800 ppm.

The characteristics of the substrate SU16 are as follows:

The silica-alumina composition of the substrate matrix is 60.7% $Al_2O_3$ and 39.3% $SiO_2$.

The BET surface area is 284 m²/g.

The total pore volume, measured by nitrogen adsorption, is 0.46 ml/g.

The mean pore diameter, measured by mercury porosimetry, is 68 Å.

The ratio between the volume V2, measured by mercury porosimetry, comprised between $D_{mean}-30$ Å and $D_{mean}+30$ Å, to the total mercury volume is 0.89.

The volume V3, measured by mercury porosimetry, contained in the pores with diameters greater than $D_{mean}+30$ Å, is 0.031 ml/g.

The volume V6, measured by mercury porosimetry, contained in the pores with diameters greater than $D_{mean}+15$ Å, is 0.040 ml/g.

The pore volume, measured by mercury porosimetry, contained in the pores with diameters greater than 140 Å, is 0.012 ml/g.

The pore volume, measured by mercury porosimetry, contained in the pores with diameters greater than 160 Å, is 0.008 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.79 g/cm³.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite Z3.

The content of atomic sodium is 200+/−20 ppm. The content of atomic sulphur is 800 ppm.

EXAMPLE 8

Preparation of Hydrocracking Catalyst Substrates According to the Invention (SU16 to SU20)

A zeolite ZBM-30 synthesised according to BASF Patent EP-A-46504 with the organic structuring agent triethylenetetramine. It is then subjected to calcination at 550° C. in a dry air stream for 12 hours. The zeolite H-ZBM-30 (acid form) thus obtained has an Si/Al ratio of 45 and an Na/Al ratio of less than 0.001.

Then 5 g of the zeolite ZBM30 described above and 95 g of the substrate precursors SU1 to SU4 referred to solid matter such as those described above are mixed. This mixing is carried out before introduction into the extruder. The zeolite powder is pre-wetted and added to the matrix suspension in the presence of 66% nitric acid (7% by weight of acid per gram of dry gel) then mixed for 15 minutes. On completion of this mixing, the paste obtained is passed through a die with cylindrical holes of diameter equal to 1.4 mm. The extrudates are then dried overnight at 120° C. in air then calcined at 550° C. in air, then calcined at 700° C. in the presence of water vapour.

The substrates SU17 to SU20 are thus obtained.

The characteristics of the substrates according to the invention are:

For the substrate SU17, the composition of the substrate matrix is 50.1% $Al_2O_3$-49.9% $SiO_2$.

The BET surface area of the substrate is 280 m$^2$/g.

The total pore volume, measured by nitrogen adsorption, is 0.445 ml/g.

The mean pore diameter, measured by mercury porosimetry, is 64 Å.

The ratio between the volume V2, measured by mercury porosimetry, comprised between $D_{mean}$−30 Å and $D_{mean}$+30 Å, to the total mercury volume is 0.91.

The volume V3, measured by mercury porosimetry, contained in the pores with diameters greater than $D_{mean}$+30 Å, is 0.03 ml/g.

The volume V6, measured by mercury porosimetry, contained in the pores with diameters greater than $D_{mean}$+15 Å, is 0.047 ml/g.

The pore volume, measured by mercury porosimetry, contained in the pores with diameters greater than 140 Å, is 0.015 ml/g.

The pore volume, measured by mercury porosimetry, contained in the pores with diameters greater than 160 Å, is 0.012 ml/g.

The pore volume, measured by mercury porosimetry, contained in the pores with diameters greater than 200 Å, is 0.010 ml/g.

The pore volume, measured by mercury porosimetry, contained in the pores with diameters greater than 500 Å, is 0.001 ml/g.

The packing density of the substrate is 0.795 g/cm$^3$.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite ZBM30.

The content of atomic sodium is 290+/−20 ppm. The content of atomic sulphur is 1500 ppm.

For the substrate SU18, the characteristics of the substrates are as follows:

The silica-alumina composition of the substrate matrix is 69.5% $Al_2O_3$ and 30.5% $SiO_2$.

The BET surface area is 276 m$^2$/g.

The total pore volume, measured by nitrogen adsorption, is 0.43 ml/g.

The mean pore diameter, measured by mercury porosimetry, is 69 Å.

The ratio between the volume V2, measured by mercury porosimetry, comprised between $D_{mean}$−30 Å and $D_{mean}$+30 Å, to the total mercury volume is 0.9.

The volume V3, measured by mercury porosimetry, contained in the pores with diameters greater than $D_{mean}$+30 Å, is 0.020 ml/g.

The volume V6, measured by mercury porosimetry, contained in the pores with diameters greater than $D_{mean}$+15 Å, is 0.034 ml/g.

The pore volume, measured by mercury porosimetry, contained in the pores with diameters greater than 140 Å, is 0.011 ml/g.

The pore volume, measured by mercury porosimetry, contained in the pores with diameters greater than 160 Å, is 0.010 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.795 g/cm$^3$.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the lines characteristic of the zeolite ZBM30.

The content of atomic sodium is 230+/−20 ppm. The content of atomic sulphur is 1900 ppm.

The characteristics of the substrate SU19 are as follows:

The silica-alumina composition of the matrix is 59.7% $Al_2O_3$ and 40.3% $SiO_2$.

The BET surface area is 275 m$^2$/g.

The total pore volume, measured by nitrogen adsorption, is 0.435 ml/g.

The mean pore diameter, measured by mercury porosimetry, is 68 Å.

The ratio between the volume V2, measured by mercury porosimetry, comprised between $D_{mean}$−30 Å and $D_{mean}$+30 Å, to the total mercury volume is 0.9.

The volume V3, measured by mercury porosimetry, contained in the pores with diameters greater than $D_{mean}$+30 Å, is 0.021 ml/g.

The volume V6, measured by mercury porosimetry, contained in the pores with diameters greater than $D_{mean}$+15 Å, is 0.030 ml/g.

The pore volume, measured by mercury porosimetry, contained in the pores with diameters greater than 140 Å, is 0.011 ml/g.

The pore volume, measured by mercury porosimetry, contained in the pores with diameters greater than 160 Å, is 0.010 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite ZBM30.

The content of atomic sodium is 190+/−20 ppm. The content of atomic sulphur is 800 ppm.

The packing density of the substrate is 0.795 g/cm$^3$.

The characteristics of the substrate SU20 are as follows:
The silica-alumina composition of the substrate matrix is 60.7% $Al_2O_3$ and 39.3% $SiO_2$.

The BET surface area is 284 m$^2$/g.

The total pore volume, measured by nitrogen adsorption, is 0.435 ml/g.

The mean pore diameter, measured by mercury porosimetry, is 68 Å.

The ratio between the volume V2, measured by mercury porosimetry, comprised between $D_{mean}$−30 Å and $D_{mean}$+30 Å, to the total mercury volume is 0.89.

The volume V3, measured by mercury porosimetry, contained in the pores with diameters greater than $D_{mean}$+30 Å, is 0.031 ml/g.

The volume V6, measured by mercury porosimetry, contained in the pores with diameters greater than $D_{mean}$+15 Å, is 0.040 ml/g.

The pore volume, measured by mercury porosimetry, contained in the pores with diameters greater than 140 Å, is 0.011 ml/g.

The pore volume, measured by mercury porosimetry, contained in the pores with diameters greater than 160 Å, is 0.006 ml/g.

The pore volume, measured by mercury porosimetry, contained in the pores with diameters greater than 200 Å, is 0.006 ml/g.

The pore volume, measured by mercury porosimetry, contained in the pores with diameters greater than 500 Å, is 0.001 ml/g.

The packing density of the substrate is 0.79 g/cm$^3$.

The X-ray diffraction diagram contains:
the main lines characteristic of gamma alumina and in particular it contains the peaks with a "d" value between 1.39 to 1.40 Å and with a "d" value between 1.97 Å to 2.00 Å,
the main lines characteristic of the zeolite ZBM30.

The content of atomic sodium is 190+/−20 ppm. The content of atomic sulphur is 800 ppm.

EXAMPLE 9

Preparation of Hydrocracking Catalysts According to the Invention (C1 to C20)

The catalysts C1 to C20 are obtained by dry impregnation, with an aqueous solution containing salts of tungsten and nickel, respectively of substrates SU1 to SU20 in the form of extrudates, the preparations of which have been described respectively in Examples 1 to 7. The tungsten salt is ammonium metatungstate $(NH_4)_6H_2W_{12}O_{40}*4H_2O$ and the nickel salt is nickel nitrate $Ni(NO_3)_2*6H_2O$. Following maturation at ambient temperature in a water saturated atmosphere, the impregnated extrudates are dried at 120° C. overnight then calcined at 500° C. in dry air.

The final contents by weight of $WO_3$ and NiO in the catalysts are presented in Table 1 below.

TABLE 1

Contents by weight of $WO_3$ and NiO in catalysts C1 to C8

|  | C1 | C2 | C3 | C4 | C5 | C6 | C7 | C8 |
|---|---|---|---|---|---|---|---|---|
| NiO (% weight) | 3.6 | 3.3 | 3.5 | 3.4 | 3.5 | 3.5 | 3.4 | 3.2 |
| $WO_3$ (% weight) | 24.7 | 24.8 | 24.3 | 24.6 | 24.5 | 24.9 | 24.3 | 24.4 |

TABLE 2

Contents by weight of $WO_3$ and NiO in catalysts C9 to C16

|  | C9 | C10 | C11 | C12 | C13 | C14 | C15 | C16 |
|---|---|---|---|---|---|---|---|---|
| NiO (% weight) | 3.5 | 3.4 | 3.3 | 3.4 | 3.5 | 3.4 | 3.5 | 3.3 |
| $WO_3$ (% weight) | 24.8 | 24.9 | 25 | 24.7 | 24.8 | 24.9 | 24.4 | 24.5 |

TABLE 3

Contents by weight of $WO_3$ and NiO in catalysts C17 to C20

|  | C17 | C18 | C19 | C20 |
|---|---|---|---|---|
| NiO (% weight) | 3.4 | 3.45 | 3.35 | 3.4 |
| $WO_3$ (% weight) | 24.9 | 24.95 | 25 | 24.75 |

EXAMPLE 10

The catalysts C21 and C22 are obtained by dry impregnation of the substrates SU3 and SU10 (in the form of extrudates), prepared in Examples 1 and 5 by dry impregnation with a solution of hexachloroplatinic acid $H_2PtCl_6$. The impregnated extrudates are then calcined at 550° C. in dry air. The platinum content is 0.49% by weight.

EXAMPLE 11

Evaluation of Catalysts C1 to C20 in Hydrocracking of a Vacuum Distillate in a Single Stage at High Pressure The catalysts C1 to C20 of which the preparation is described in Example 9 were used to perform hydrocracking of a vacuum distillate of which the principal characteristics are given below:

| Type of feedstock | Vacuum distillate |
|---|---|
| Density at 15° C. | 0.9219 |
| Sulphur % by weight | 2.52 |
| Nitrogen ppm weight | 880 |

| Simulated distillation | |
|---|---|
| SD: 05% p ° C. | 367 |
| SD: 10% p ° C. | 380 |
| SD: 50% p ° C. | 443 |

-continued

| Simulated distillation | |
|---|---|
| SD: 90% p ° C. | 520 |
| SD: End point ° C. | 690 |

The catalysts C1 to C20 were deployed according to the process of the invention in a pilot facility including 1 reactor with fixed traversed bed, whereby the fluids circulate upward (up-flow).

Prior to the hydrocracking test, the catalysts were sulphurised at 120 bars, at 350° C. by means of a direct distillation gas oil treated with 2% by weight of DMDS.

After sulphurisation, the catalytic tests were conducted under the following conditions:
Total pressure: 14 MPa
Space velocity (HSV) equal to 0.7 h−1.
Temperature required to reach 70% net conversion.

The catalytic performances are expressed by the net conversion to products having a boiling point below 370° C., by the net middle distillate selectivity of the 150-370° C. cut and the ratio of gas oil yield/kerosene yield in the middle distillate fraction. They are expressed on the basis of the simulated distillation results.

The net conversion (NC) is assumed to be equal to:
NC 370° C.=[(% of 370° C.$^-_{effluents}$)−(% of 370° C.$^-_{feedstock}$)]/[100−(% of 370° C.$^-_{feedstock}$)]

with

% of 370° C.$^-_{effluents}$=content by weight of compounds with boiling points below 370° C. in the effluents, and % of 370° C.$^-_{feedstock}$=content by weight of compounds with boiling points below 370° C. in the feedstock.

The gross selectivity on middle distillate (GS) is assumed to be equal to:
GS definition=[(fraction in 150–370$_{effluents}$)]/[(% of 370° C.$^-_{effluents}$)]

The ratio of gas oil yield/kerosene yield (Go/Ker ratio) in the middle distillate fraction is assumed to be equal to:
Go/Ker ratio=yield of the (250° C.-370° C.) fraction of the effluent/yield of the (150° C.-250° C.) fraction in the effluent.

The catalytic performances obtained are given in Table 2 below.

TABLE 4

Catalytic results for single-stage hydrocracking at high pressure

| Catalyst | HSV (h$^{-1}$) | T required for 70% NC 370° C.$^-$ % by weight | GS % by weight Middle distillate (MD) |
|---|---|---|---|
| C1 | 0.7 | 400° C. | 73.9 |
| C2 | 0.7 | 399° C. | 73.8 |
| C3 | 0.7 | 399° C. | 73.9 |
| C4 | 0.7 | 399° C. | 73.8 |
| C5 | 0.7 | 395° C. | 73.6 |
| C6 | 0.7 | 394° C. | 73.7 |
| C7 | 0.7 | 394° C. | 73.7 |
| C8 | 0.7 | 395° C. | 73.6 |
| C9 | 0.7 | 395° C. | 73.7 |
| C10 | 0.7 | 395° C. | 73.7 |
| C11 | 0.7 | 395° C. | 73.8 |
| C12 | 0.7 | 396° C. | 73.7 |
| C13 | 0.7 | 396° C. | 73.9 |
| C14 | 0.7 | 395° C. | 73.9 |
| C15 | 0.7 | 395° C. | 73.9 |

TABLE 4-continued

Catalytic results for single-stage hydrocracking at high pressure

| Catalyst | HSV (h$^{-1}$) | T required for 70% NC 370° C.$^-$ % by weight | GS % by weight Middle distillate (MD) |
|---|---|---|---|
| C16 | 0.7 | 395° C. | 73.8 |
| C17 | 0.7 | 396° C. | 73.9 |
| C18 | 0.7 | 395° C. | 73.9 |
| C19 | 0.7 | 395° C. | 73.9 |
| C20 | 0.7 | 395° C. | 73.9 |

The examples show that, irrespective of the nature of the zeolite selected, the incorporation of a zeolite makes possible a significant gain in activity without loss of selectivity.

EXAMPLE 11

Evaluation of Catalyst C21 and C22 Under Conditions Simulating the Operation of the Second Reactor in a So-Called Two-Stage Hydrocracking Process The feed for the second stage is produced by hydrotreating a vacuum distillate on a hydrorefining catalyst marketed by Axens in the presence of hydrogen, at a temperature of 395° C. and at the hourly space velocity of 0.55 h$^{-1}$. The conversion to 380° C. products is approximately 50% by weight. Following a separation stage, the 380° C.$^+$ fraction is collected and will be used as the feed for the second stage. The physico-chemical characteristics of this feedstock are provided in Table 3:

TABLE 5

| Characteristics of the second stage feed | |
|---|---|
| Density (20/4) | 0.853 |
| Sulphur (ppm by weight) | 2.5 |
| Nitrogen (ppm by weight) | 1.4 |
| Simulated distillation | |
| Initial point | 322° C. |
| 5% point | 364° C. |
| 10% point | 383° C. |
| 50% point | 448° C. |
| 90% point | 525° C. |
| End point | 589° C. |

This feed is injected into the 2$^{nd}$ stage hydrocracking test unit which includes a fixed bed reactor, with ascending circulation of the feed ("up-flow"), into which the catalyst C9 prepared in Example 9 is introduced. Before injection of the feed the catalyst is reduced in pure hydrogen at 450° C. for 2 hours.

The operating conditions of the test unit are as follows:

| Total pressure | 14 MPa |
|---|---|
| Catalyst | 50 ml |
| Temperature | 370° C. |
| Space velocity (HSV) h−1 | 1.1 |

The catalytic performances obtained under these conditions are described in Table 4 of this example.

TABLE 4

Catalytic results

| Catalyst | HSV (h$^{-1}$) | NC 370° C.$^-$ % by weight | GS % by weight Middle distillate (MD) |
|---|---|---|---|
| C21 | 1.1 | 78 | 72.0 |
| C22 | 1.1 | 79.2 | 71.9 |

Examples 10 and 11 therefore clearly demonstrate the advantages of using a catalyst according to the invention to perform hydrocracking of hydrocarbon feedstocks. In effect, they make it possible to obtain high feedstock conversion rates and advantageous selectivities on middle distillates.

EXAMPLE 12

Evaluation of Catalysts C5 and C9 in Hydrocracking of a Vacuum Distillate in a Single Stage at Moderate Pressure (Mild Hydrocracking)

The catalysts C5 and C9 of which the preparation is described in example 9 are used to perform hydrocracking of vacuum distillate, described in Example 11.

The catalysts C5 to C9 were deployed according to the process of the invention in a pilot unit including 1 reactor with fixed traversed bed, whereby the fluids circulate upward (upflow).

Prior to the hydrocracking test, the catalysts were sulphurised at 120 bars, at 350° C. by means of a direct distillation gas oil treated with 2% by weight of DMDS.

After sulphurisation, the catalytic tests were conducted under the following conditions:

| | | |
|---|---|---|
| Total pressure | 5.5 MPa | T = 405° C. |
| Overall HSV | 0.8 h$^{-1}$ | |
| Space velocity (HSV) equal to | 0.8 h$^{-1}$. | |

The catalytic performances are expressed by the net conversion to products having a boiling point below 370° C., by the net middle distillate selectivity of the 150-370° C. cut and the ratio of gas oil yield/kerosene yield in the middle distillate fraction. They are expressed on the basis of the results of simulated distillation and the definitions are identical to those given in Example 10.

The catalytic performances obtained are given in Table 5 below.

TABLE 5

Catalytic results in mild hydrocracking at moderate pressure

| Catalyst | HSV (h$^{-1}$) | NC 370° C.- % by weight | GS % by weight Middle distillate (MD) |
|---|---|---|---|
| C5 | 0.8 | 49.4 | 81.2 |
| C9 | 0.8 | 49.8 | 80.9 |

The invention claimed is:

1. Catalyst including at least one hydro-dehydrogenating element chosen from the group formed by the group VIB and group VIII elements of the periodic table and a substrate based on at least one zeolite and based on a silica-alumina matrix, said matrix containing a quantity greater than 5% by weight and less than or equal to 95% by weight of silica (SiO$_2$), said catalyst having the following characteristics:
a mean pore diameter, measured by mercury porosimetry, of between 20 and 140Å,
a pore distribution such that the ratio between the volume V2, measured by mercury porosimetry, comprised between $D_{mean}$−30 Å and $D_{mean}$+30 Å to the total volume measured by mercury porosimeter intrusion, is more than 0.6− the volume V3, measured by mercury porosimetry, contained in the pores with diameters greater than $D_{mean}$+30 Å, is less than 0.1 ml/g—the volume V6, measured by mercury porosimetry, contained in the pores with diameters greater than $D_{mean}$+15 Å, is less than 0.2 ml/g,
a total pore volume, measured by mercury porosimetry, comprised between 0.2 ml/g and 0.5 ml/g,
a total pore volume, measured by nitrogen porosimetry, comprised between 0.2 ml/g and 0.5 ml/g,
a BET specific surface area comprised between 100 and 600 m$^2$/g,
a pore volume, measured by mercury porosimetry, contained in the pores with diameters of more than 140 Å, of less than 0.1 ml/g,
a pore volume, measured by mercury porosimetry, contained in the pores with diameters of more than 160 Å, of less than 0.1 ml/g,
a pore volume, measured by mercury porosimetry, contained in the pores with diameters of more than 200 Å, of less than 0.1 ml/g,
a pore volume, measured by mercury porosimetry, contained in the pores with diameters of more than 500 Å, of less than 0.01 ml/g,
a packing density of the catalysts greater than 0.85 g/cm$^3$,
an X-ray diffraction diagram which contains at least the main lines characteristic of at least one of the transition aluminas that are included in the group composed of alpha, rho, chi, eta, gamma, kappa, theta and delta aluminas.

2. Catalyst according to claim 1 in which the proportion of octahedral Al$_{VI}$ determined by analysis of the NMR MAS spectra of the $^{27}$Al solid of the matrix is more than 50%.

3. Catalyst according to claim 1 based on nickel and tungsten.

4. Catalyst according to claim 1 based on nickel and molybdenum.

5. Catalyst according to claim 1 which includes at least one doping element selected from the group formed by phosphorus, boron and silicon and deposited on the catalyst.

6. Catalyst according to claim 5 in which the doping element is phosphorus.

7. Catalyst according to claim 1 which contains between 0.1 and 30% by weight of zeolite.

8. Catalyst according to claim 1 in which the substrate is based on Y zeolite.

9. Catalyst according to claim 1 in which at least one zeolite is chosen from the group formed by the zeolites ZSM-48, ZBM-30, EU-2, EU-11.

10. Catalyst according to claim 1 in which at least one zeolite is the zeolite ZBM-30.

11. Catalyst according to claim 1 in which at least one zeolite is chosen from the group formed by the zeolites Mordenite, Beta, NU-87, EU-1.

12. Substrate including:
at least one zeolite,
a non-zeolitic matrix based on silica-alumina containing a quantity greater than 5% by weight and less than or equal to 95% by weight of silica (SiO2), characterised by:

a mean pore diameter, measured by mercury porosimetry, of between 20 and 140 Å, a pore distribution such that the ratio between the volume V2, measured by mercury porosimetry, comprised between $D_{mean}-30$ Å and $D_{mean}+30$ Å, to the total volume measured by mercury porosimeter intrusion, is more than 0.6– the volume V3, measured by mercury porosimetry, contained in the pores with diameters greater than $D_{mean}+30$ Å, is less than 0.1 ml/g—the volume V6, measured by mercury porosimetry, contained in the pores with diameters greater than $D_{mean}+15$ Å, is less than 0.2 ml/g, a total pore volume, measured by mercury porosimetry, comprised between 0.2 ml/g and 0.5 ml/g, a total pore volume, measured by nitrogen porosimetry, comprised between 0.2 ml/g and 0.5 ml/g, a BET specific surface area comprised between 100 and 650 m²/g, a pore volume, measured by mercury porosimetry, contained in the pores with diameters of more than 140 Å, of less than 0.1 ml/g, a pore volume, measured by mercury porosimetry, contained in the pores with diameters of more than 160 Å, of less than 0.1 ml/g, a pore volume, measured by mercury porosimetry, contained in the pores with diameters of more than 200 Å, of less than 0.1 ml/g, a pore volume, measured by mercury porosimetry, contained in the pores with diameters of more than 500 Å, of less than 0.01 ml/g, a packing density of the substrates, after calcination, greater than 0.65 g/cm³, an X-ray diffraction diagram which contains at least the main lines characteristic of at least one of the transition aluminas that are included in the group composed of rho, chi, eta, gamma, kappa, theta and delta aluminas.

13. Substrate according to claim 12 such that the X-ray diffraction diagram contains at least the main lines characteristic of at least one of the transition aluminas that are included in the group composed of eta, theta, delta and gamma aluminas.

14. Substrate according to claim 12 such that the X-ray diffraction diagram contains at least the main lines characteristic of at least one of the transition aluminas that are included in the group composed of eta and gamma aluminas.

15. Substrate according to claim 12 such that the mean pore diameter is between 40 and 120 Å.

16. Substrate according to claim 12 such that the matrix contains at least two silica-alumina zones having Si/Al ratios that are less than or greater than the overall Si/Al ratio determined by X-ray fluorescence.

17. Substrate according to claim 12 such that the matrix contains a single silica-alumina zone having an Si/Al ratio equal to the overall Si/Al ratio determined by X-ray fluorescence and less than 2.3.

18. Hydrocracking and/or hydroconversion process for hydrocarbon feedstocks using the catalyst according to claim 1.

19. Hydrocracking and/or hydroconversion process according to claim 18 conducted by a single-stage process.

20. Hydrocracking and/or hydroconversion process according to claim 18 including at least one first hydrorefining reaction zone and at least one second reaction zone including hydrocracking of at least part of the effluent from the first zone and including incomplete separation of the ammonia from the effluent leaving the first zone.

21. Hydrocracking and/or hydroconversion process according to claim 19 including:

a first hydrorefining reaction zone in which the feed is contacted with at least one hydrorefining catalyst presenting in the standard activity test a cyclohexane conversion rate of less than 10% by mass, a second hydrocracking reaction zone in which at least a part of the effluent leaving the hydrorefining stage is contacted with at least one zeolitic hydrocracking catalyst presenting in the standard activity test a cyclohexane conversion rate of more than 10% by mass, the catalyst according to the invention being present in at least one of the two reaction zones.

22. Hydrocracking and/or hydroconversion process according to claim 18 in a two-stage process.

23. Process according to claim 18 operating, in the presence of hydrogen, at a temperature more than 200° C., at a pressure more than 1 MPa, the space velocity being comprised between 0.1 and 20 h$^{-1}$, and the quantity of hydrogen introduced is such that the volume ratio liter of hydrogen/liter of hydrocarbon is comprised between 80 and 5000 l/l.

24. Hydrocracking and/or hydroconversion process according to claim 18 operating at a pressure comprised between 2 and 6 MPa and leading to conversions less than 50%.

25. Process according to claim 18 operating in fixed bed.

26. Process according to claim 18 operating in ebullated bed.

27. Process according to claim 18 in which the catalyst used for hydrocracking is based on platinum and/or palladium.

28. Hydroprocessing process for hydrocarbon feedstocks using the catalyst according to claim 1.

29. Process according to claim 28 placed upstream of a hydrocracking process.

30. Process according to claim 18 in which the hydrocarbon feedstocks are chosen from the group formed by LCO (light cycle oil), atmospheric distillates, vacuum distillates, feeds from aromatic extraction units from base lubricating oils or derived from solvent dewaxing of base lubricating oils, distillates derived from processes of desulphurisation or fixed bed or ebullated bed hydroconversion of atmospheric residues and/or vacuum residues and/or deasphalted oils, deasphalted oils, alone or in a mixture.

31. Hydrocracking and/or hydroconversion process for hydrocarbon feedstocks using the catalyst containing the substrate according to claim 12.

32. Hydroprocessing process for hydrocarbon feedstocks using the catalyst containing the substrate according to claim 12.

* * * * *